United States Patent [19]

McGarvey et al.

[11] Patent Number: 5,319,545

[45] Date of Patent: * Jun. 7, 1994

[54] SYSTEM TO MONITOR MULTIPLE FUEL DISPENSERS AND FUEL SUPPLY TANK

[75] Inventors: David C. McGarvey, San Gabriel, Calif.; E. Michael Gregory, Garland, Tex.

[73] Assignee: LRS, Inc., South El Monte, Calif.

[*] Notice: The portion of the term of this patent subsequent to Oct. 8, 2008 has been disclaimed.

[21] Appl. No.: 641,169

[22] Filed: Jan. 14, 1991

Related U.S. Application Data

[63] Continuation-in-part of Ser. No. 386,813, Jul. 31, 1989, Pat. No. 5,036,585.

[51] Int. Cl.$^5$ .............................................. G06F 15/20
[52] U.S. Cl. ..................................... 364/403; 73/292; 73/49.2; 364/571.04
[58] Field of Search ............... 364/400, 401, 403, 479, 364/468, 571.04, 571.05; 73/40, 49.2 R, 49.2 T, 290 R, 291, 292, 149

[56] References Cited

U.S. PATENT DOCUMENTS

| | | |
|---|---|---|
| Re. 31,884 | 5/1985 | Hansel et al. ..................... 73/49.2 T |
| 810,237 | 1/1906 | Wadsworth . |
| 1,114,019 | 10/1914 | Morris . |
| 1,273,195 | 7/1918 | Snyder . |
| 1,625,765 | 4/1927 | Ratzenstein . |
| 1,724,582 | 8/1929 | Hart . |
| 2,460,054 | 1/1949 | Wiggins . |
| 2,558,694 | 6/1951 | Speig . |
| 2,772,834 | 12/1956 | Swenson et al. ...................... 237/67 |
| 2,864,527 | 12/1958 | Altman et al. . |
| 2,869,751 | 1/1959 | Klope et al. . |
| 2,931,211 | 4/1960 | McCullough . |
| 3,595,424 | 7/1971 | Jackson .............................. 114/74 R |
| 3,666,132 | 5/1972 | Yamamoto et al. . |
| 3,702,592 | 11/1972 | Gamble .................................. 109/29 |
| 3,827,455 | 8/1974 | Lee ...................................... 137/375 |
| 3,952,907 | 4/1976 | Ogden et al. ........................ 137/312 |
| 3,969,563 | 7/1976 | Hollis, Sr. ............................ 89/36.01 |
| 3,984,032 | 10/1976 | Hyde et al. .......................... 364/479 |
| 4,200,785 | 4/1980 | Evans et al. . |
| 4,281,534 | 8/1981 | Hansel ................................ 73/49.2 T |
| 4,300,388 | 11/1981 | Hansel et al. ..................... 73/49.2 T |
| 4,349,882 | 9/1982 | Asmundsson et al. ........... 73/304 C |
| 4,376,489 | 3/1983 | Clemens .............................. 220/1.5 |
| 4,427,132 | 1/1984 | Thomson ........................... 73/290 V |
| 4,651,893 | 3/1987 | Mooney .............................. 220/445 |
| 4,685,327 | 8/1987 | Sharp .................................. 73/49.2 |
| 4,697,618 | 10/1987 | Youtt et al. ........................... 137/587 |
| 4,720,800 | 1/1988 | Suzuki et al. .................... 364/571.04 |
| 4,815,621 | 3/1989 | Bartis .................................. 220/202 |
| 4,826,644 | 5/1989 | Lindquist et al. ...................... 264/71 |
| 4,835,522 | 5/1989 | Andrejasich et al. ............... 73/49.2 |
| 4,844,287 | 7/1989 | Long ................................... 220/429 |
| 4,852,054 | 7/1989 | Mastandrea ........................... 73/292 |
| 4,890,983 | 1/1990 | Solomon et al. .................... 137/376 |
| 4,972,710 | 11/1990 | Uhlarik et al. ......................... 73/292 |
| 4,977,528 | 12/1990 | Norris ............................. 364/571.04 |
| 5,052,223 | 10/1991 | Regnault et al. ...................... 73/292 |
| 5,056,017 | 10/1991 | McGarvey ........................... 364/403 |

OTHER PUBLICATIONS

Uniform Fire Code, 1985 Ed., pp. 203-278 discloses means for controlling the level of liquids.
Reliance tank sales materials (undated).
Agape Tank Sales materials (dated by postmark Jun. 7, 1989).
Facsimile dated May 9, 1989 from Doehrman, Inc.
Sales materials from Safe-T-Tank Corp. dated 1987.
UL 142 Standard for Safety, Steel Aboveground Tanks (1987).
Instructions and part list, Husky 1030 Double Diaphragm Pump, 1987.
"Oil Evacuation System", Aro Corp., 1982.
"½" Waste Oil Evacuation System, dated Mar. 15, 1987.
"Air-Operated Diaphragm Pumps", Aro Corp., 1986.
"Lubrication Equipment", Aro Corp., 1989.
Cla-Val Co. Float Control parts list 1977.

Primary Examiner—Roy N. Envall, Jr.
Assistant Examiner—J. L. Hazard
Attorney, Agent, or Firm—William W. Haefliger

[57] ABSTRACT

Apparatus is provided to monitor fuel level in a tank or tanks, and to monitor fuel pumped from multiple dispensers; and outputs from the monitoring equipment are processed to determine unwanted loss of fuel from the tank, and to determine fuel delivered to the tank.

7 Claims, 17 Drawing Sheets

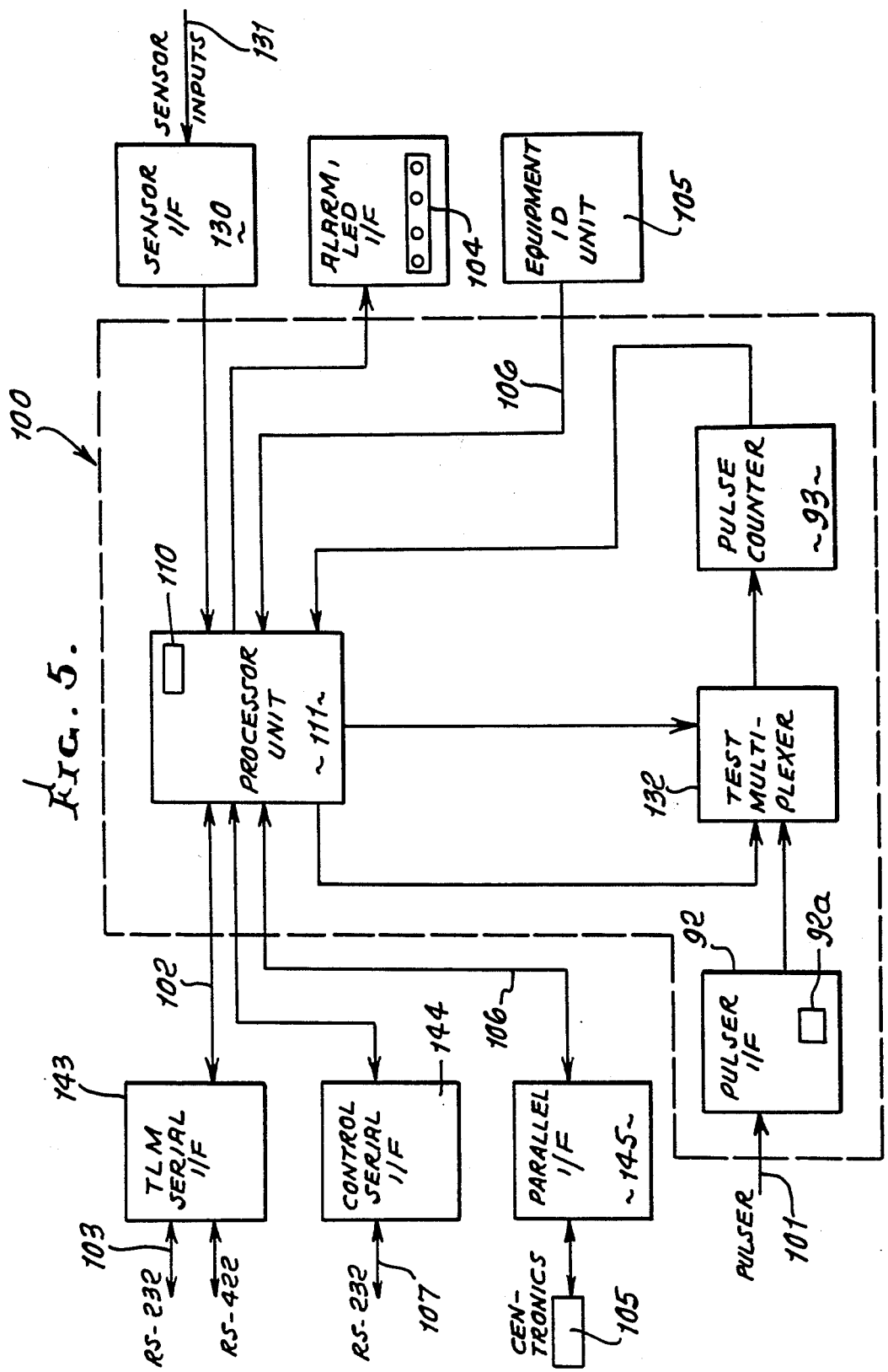

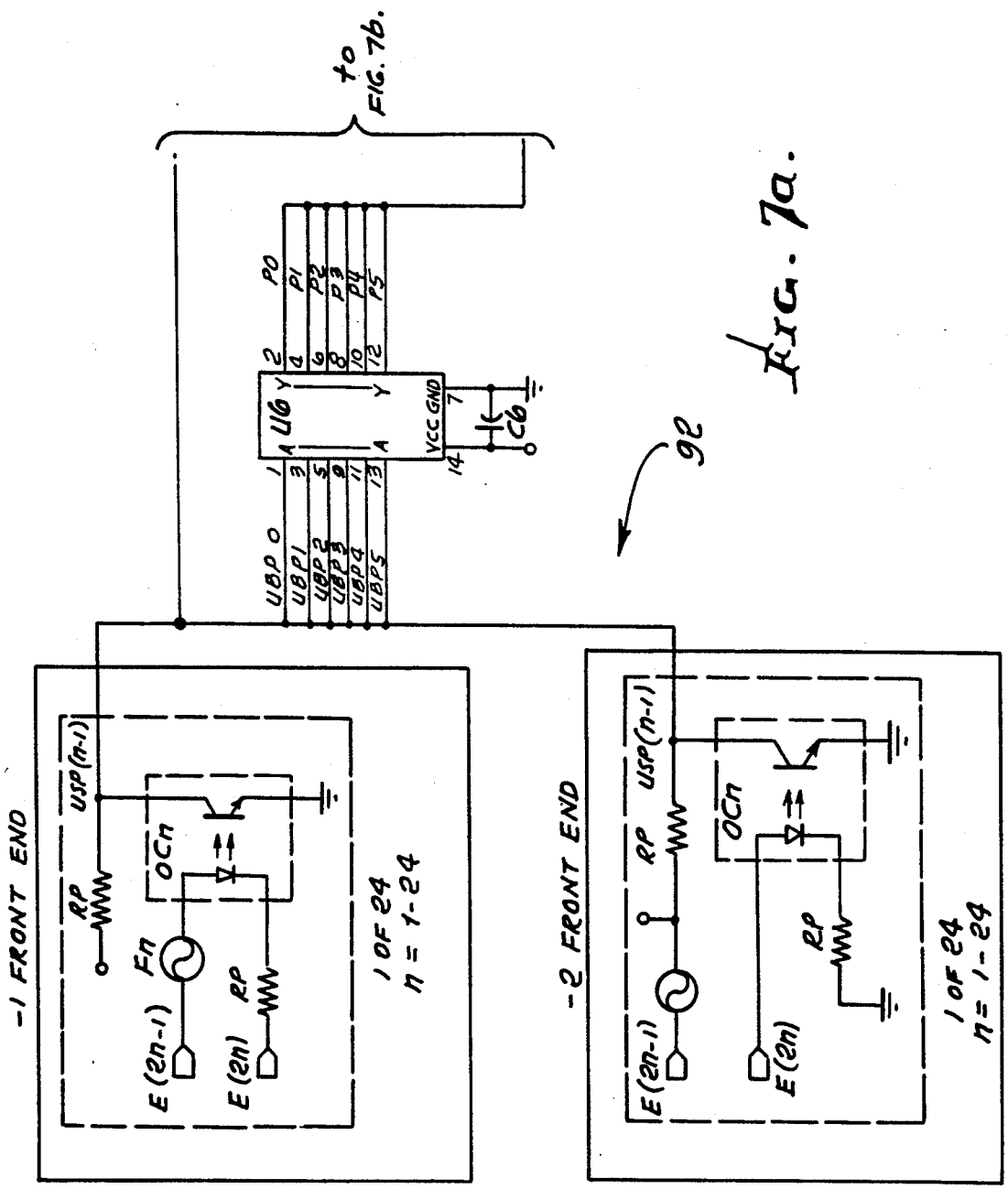

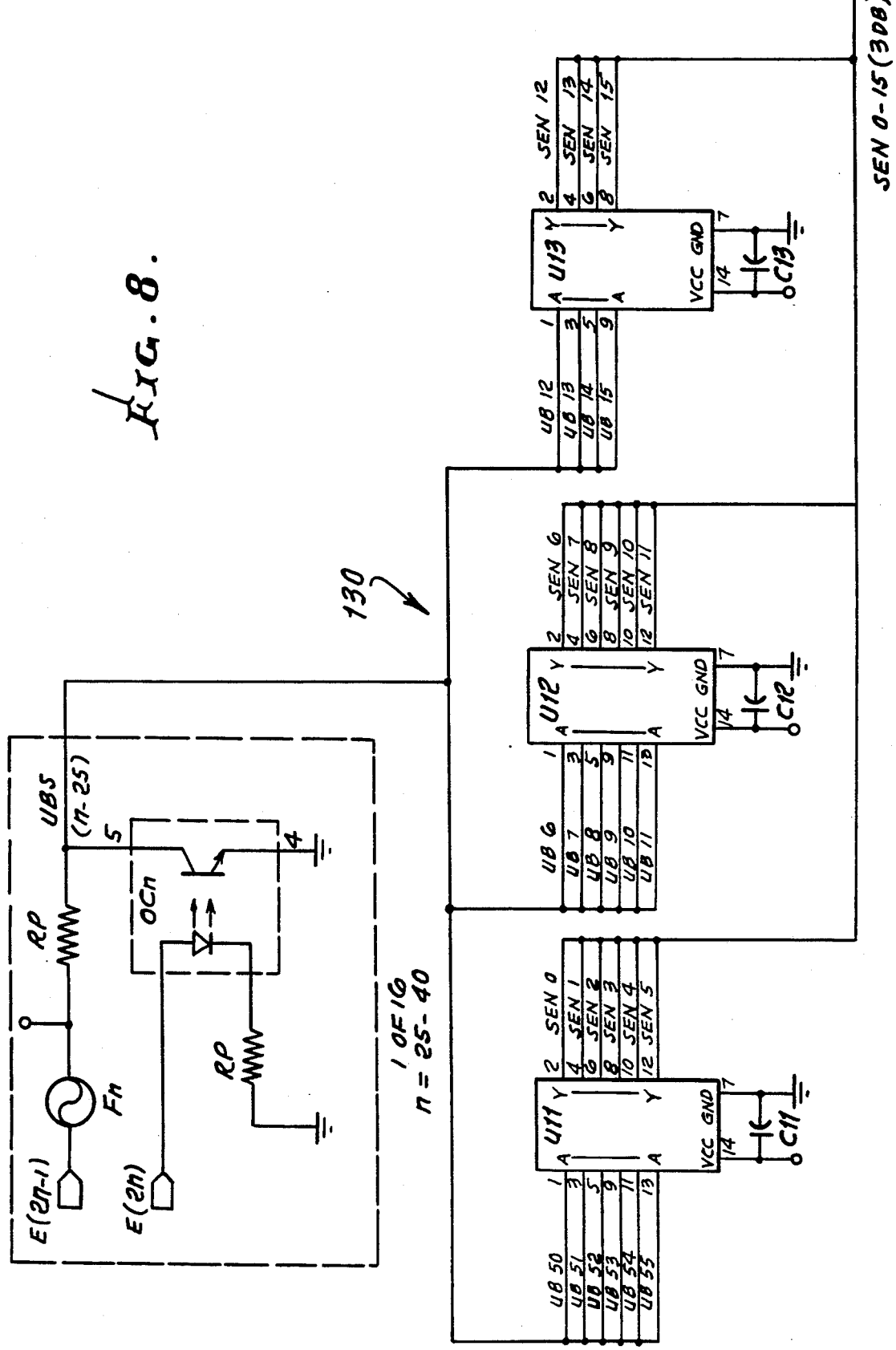

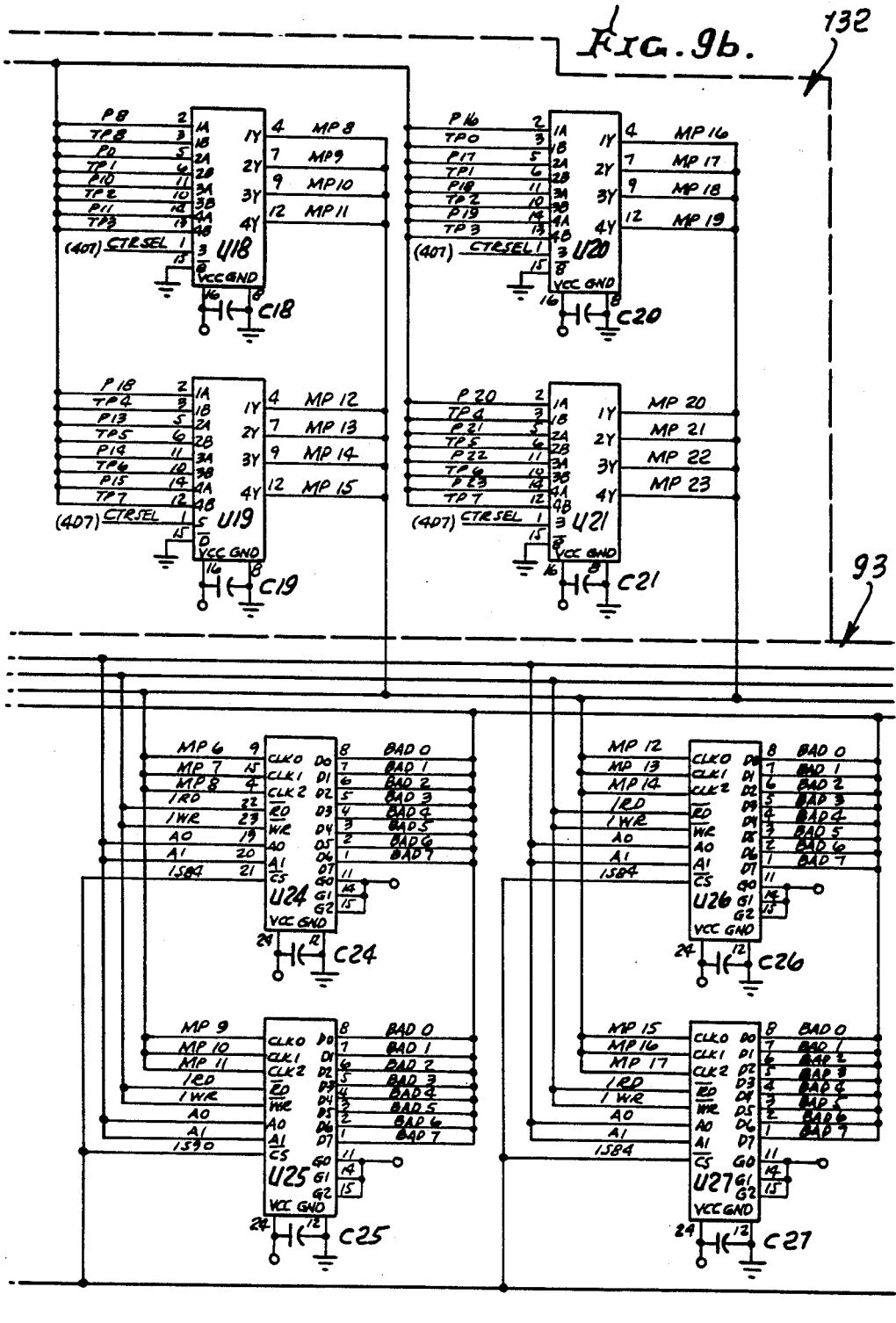

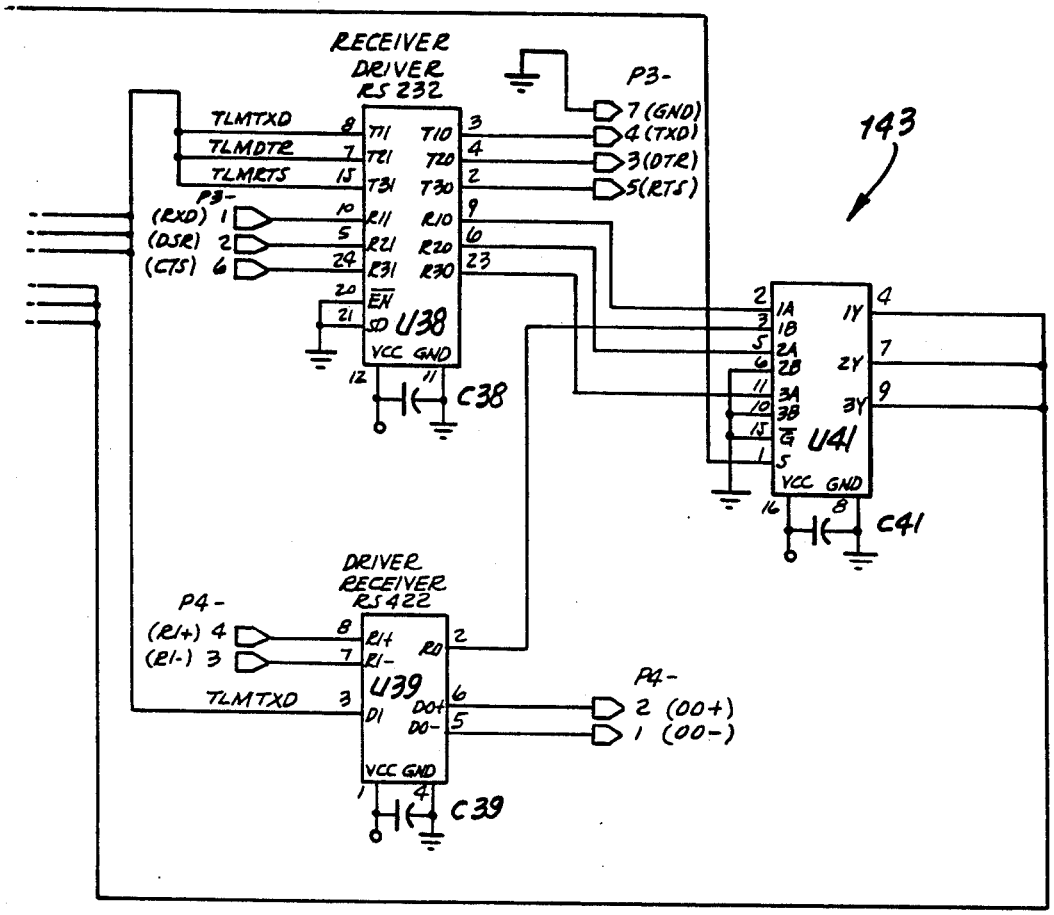
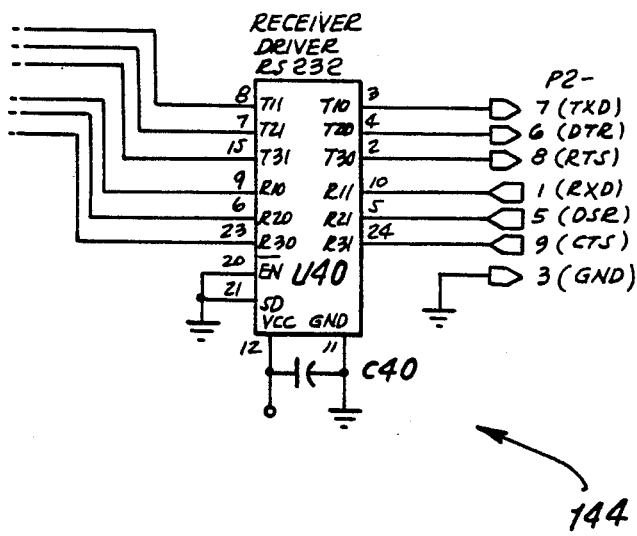
Fig. 10b.

Fig. 12b.
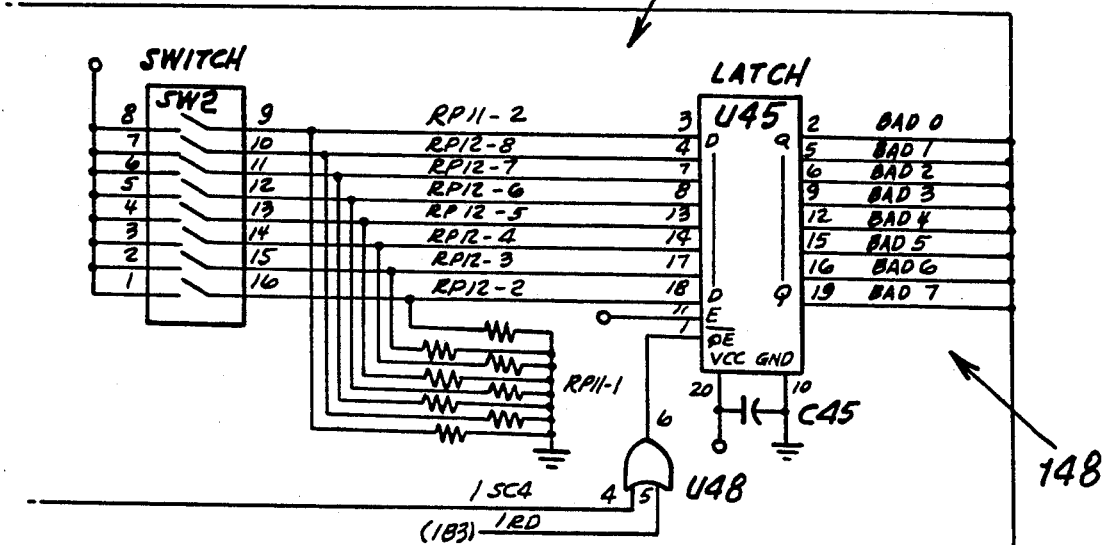
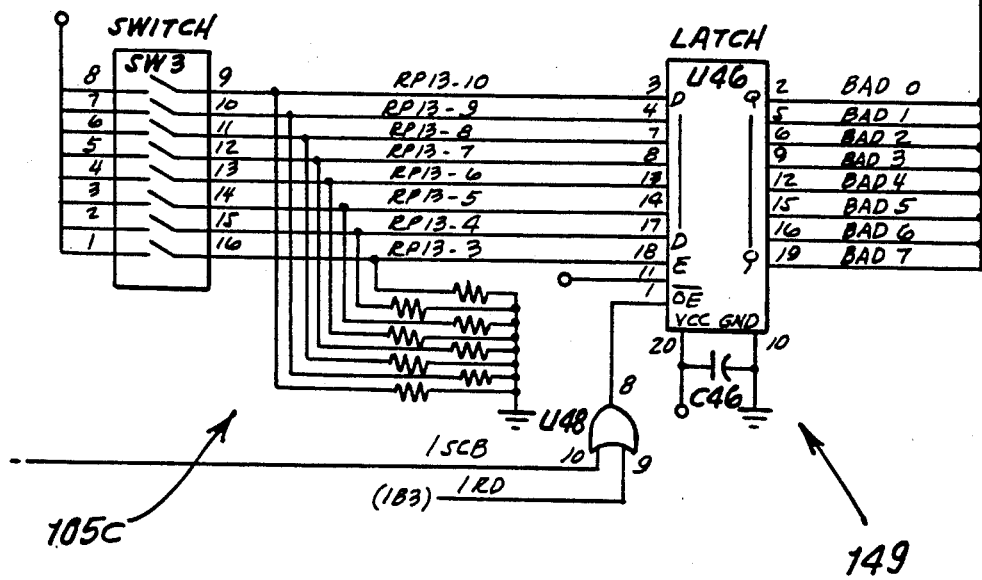
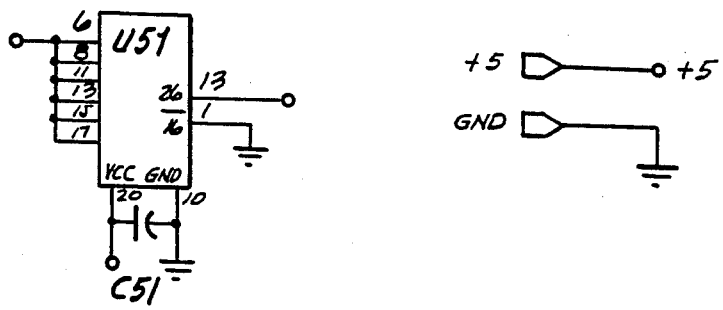

SYSTEM TO MONITOR MULTIPLE FUEL DISPENSERS AND FUEL SUPPLY TANK

This application is a continuation-in-part of Ser. No. 386,813 filed Jul. 31, 1989 now U.S. Pat. No. 5,036,585. This invention relates generally to systems for monitoring fuel dispensed from multiple dispensers, as at gasoline filling stations, and for monitoring liquid fuel inventory in a tank from which liquid fuel is supplied to the multiple dispensers; more particularly, it concerns systems for monitoring and reporting such fuel inventory, supply and dispensing, as well as other parameters.

BACKGROUND OF THE INVENTION

During the time that liquid fuel is not dispensed from an underground tank, leakage can be detected by observing changes in the liquid top surface level in the tank. However, if liquid fuel is being intermittently dispensed from the tank, as via a pump and metering means, it is clear that changes in top surface level liquid fuel in the tank do not per se reflect leakage. There is need for accurate, reliable and simple means to monitor both liquid level in the tank as well as the amount of liquid dispensed from the tank for supply to multiple dispensers in order to arrive at an accurate determination of any such "unwanted loss". The latter can arise for example from drainage through small holes in the tank, or from pilferage from the tank, as via an inlet to the tank or leakage from hoses or lines leading from the tank to the dispenser.

There is also need for equipment to accurately monitor and report, for predetermined recording periods, gross and net fuel volumes, average fuel temperature in the tank, volumes of fuel deliveries received in the tank; and volume of fuel dispensed, as via the multiple dispensers.

SUMMARY OF THE INVENTION

It is a major object of the invention to provide system and method for meeting the above needs. Basically, the environment of the invention includes apparatus to monitor liquid inventory in a storage tank or tanks, and employs multiple dispenser means to dispense liquid fuel received from the tank or tanks, there being pulse generating means operatively connected with the dispenser means to generate pulses in accordance with increments of fuel dispensed.

In this environment, the invention comprises:
a) interface means operatively connected to pulser means to sense the pulses and to convert them into first volume indicating data values corresponding to the respective multiple dispensers,
b) the interface means also operatively connected to second means at the tank to:
  i) sense liquid level in the tank and to provide second volume indicating data values, during a predetermined time interval, and
  ii) sense volume of fuel delivered to the tank during the predetermined time interval,
c) and computer means operatively connected to the interface means to control same, the interface means having processing means for receiving the first and second data values for processing same to provide an output or outputs indicative of fuel loss from the tank, and also indicative of fuel delivered to the tank.

As will be seen, the multiple dispenser means is typically in the form of multiple fuel dispensers, including fuel pumps and hoses as used at a fuel station; and there may be between 1 and 32 of such fuel dispensers in typical monitored systems.

It is another object of the invention to provide temperature sensor means for sensing fuel temperature in the tank at a time or times during such predetermined time intervals to produce output data corresponding thereto, the processing means of the interface processor operatively connected with the temperature sensor means to receive output data for processing. Data samples of both tank volume and dispenser volume data are stored in the interface means to be collected at a later date via a remote computer device. Also, a recorder such as a printer is typically connected with the interface means to record output or outputs of the processing means.

Yet another object of the invention is to provide interface means circuitry operable selectively in at least two, each, of the following modes:
  i) data compute mode,
  ii) command mode, to receive commands from the computer means for controlling data transmission and reception,
  iii) tank level monitor mode to sense tank liquid level and fuel volume, and to receive pulses from the dispensers,
  iv) and parallel port pass-through mode for transmitting data to a data recorder, or directly connect to the tank level monitoring means.

These and other objects and advantages of the invention, as well as the details of an illustrative embodiment, will be more fully understood from the following specification and drawings, in which:

DRAWING DESCRIPTION

FIG. 1 is a system diagram;
FIG. 2 is a functional block diagram, showing circuitry;
FIG. 3 is an elevation showing coupling of a pulse generator to a fuel dispenser register;
FIG. 4 is another functional block diagram;
FIG. 5 is a block diagram of an interface means incorporating a data processor, and usable in a system that includes a tank fuel level monitor, and pulse generator associated with multiple fuel dispensers; and
FIGS. 6A, 6B, 7A, 7B, 8, 9A, 9B, 9C, 10A, 10B, 11, 12A, and 12B are detailed circuit diagrams.

DETAILED DESCRIPTION

Figure 1:
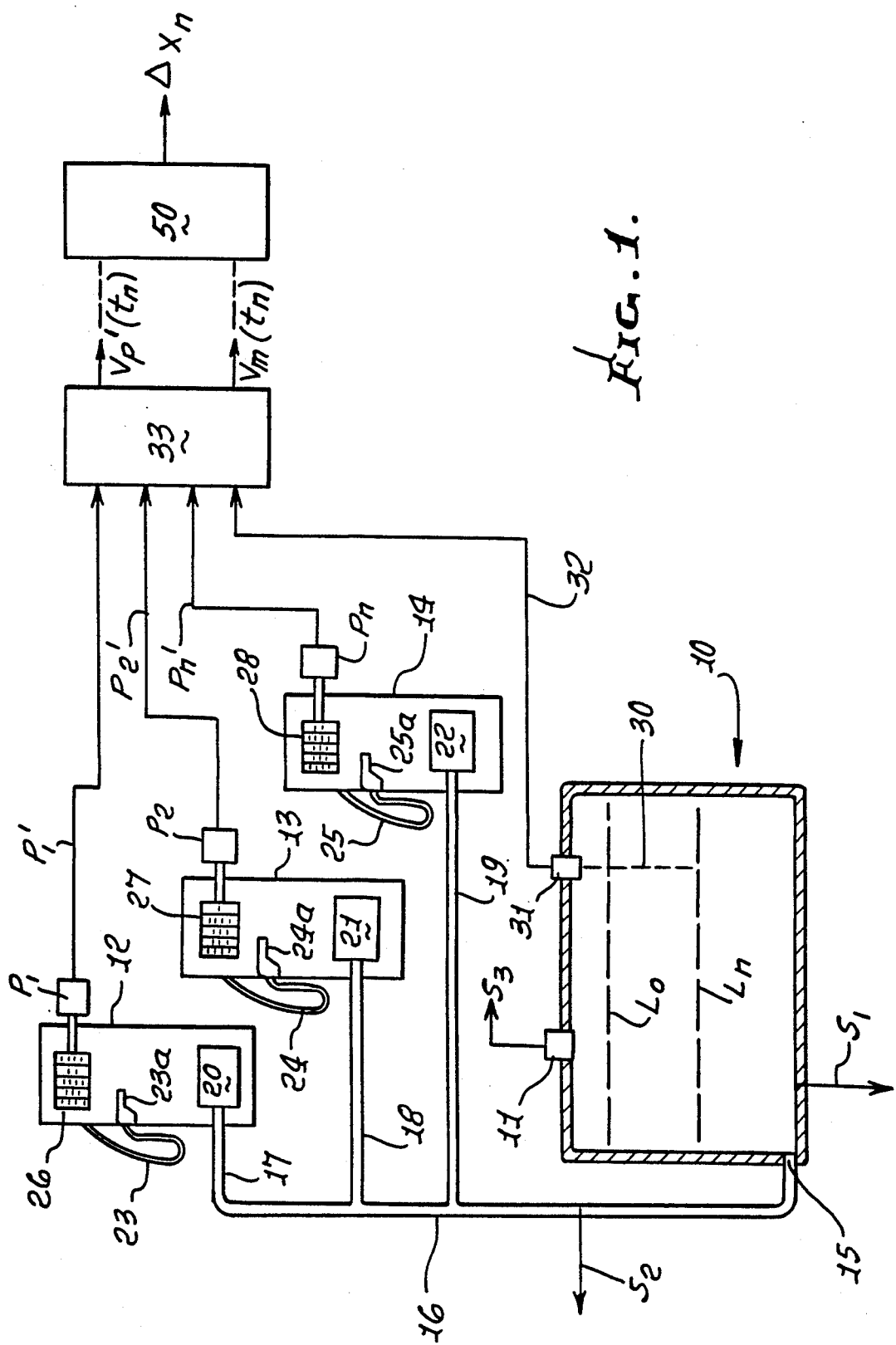

Referring to FIG. 1, a liquid fuel tank 10 has an inlet port at 11 and receives liquid fuel up to a "filled" level $L_o$. Liquid fuel is pumped from the tank to one or more dispenser units as at 12, 13 and 14, as via a tank outlet port 15, main line 16, and branch lines 17–19. The dispenser units may for example include or comprise gasoline or other fuel dispensers having pumps 20–22 activated when triggers associated with nozzles 23a, 24a, and 25a on hoses 23–25 are selectively manually displaced. The dispenser units include display registers 26–28 to indicate volume of fuel pumped and dispensed, as to automobiles.

Fuel loss or shrinkage from the tank 10 can occur as for example by leakage, indicated at $S_1$, pilferage indicated at $S_2$, or evaporation or other, indicated at $S_3$. It is a purpose of the invention to provide a system that will indicate the amount of volume of fuel loss from the tank, over a period of time after fuel has been initially filled into the tank to level $L_o$.

Figure 2:
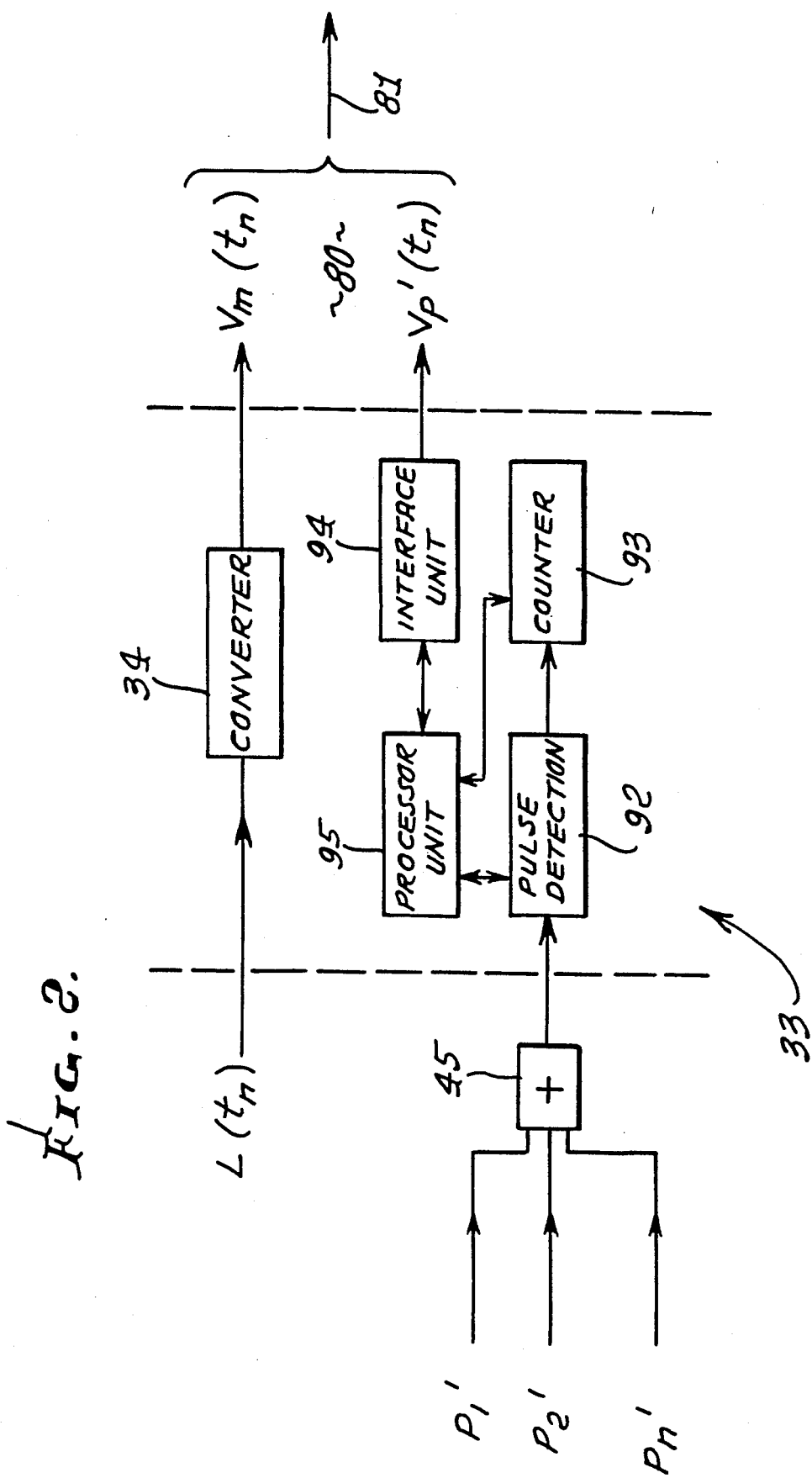

As shown in FIGS. 1 and 2, a fuel level detector is mounted on the tank to detect fuel level in the tank. That detector may for example be of known type that acoustically determines fuel level, as by transmitting acoustic waves 30 from a transmitter/receiver unit 31 mounted on the tank top, timing of wave travel from the transmitter at 31, to the surface level of the fuel, and back up to the receiver being detected to produce a readout $L(t_n)$ of surface level, i.e., at time $t_n$. At time $t_o$, the level is $L_o$, i.e., full level.

FIG. 1 shows the output 32 of the detector as transmitted to an interface means or processor 33, where a converter 34 converts the output value $L(t_n)$ to a data stream $V_m(t_n)$, i.e., measured volume of fuel leaving the tank between detected levels $L_o$ and $L_n$. Volume is a function of fuel level, so that conversion involves multiplication of the difference $(L_o-L_n)$ by a known conversion factor to produce $V_m(t_n)$, i.e., at time $t_n$.

Figure 3:
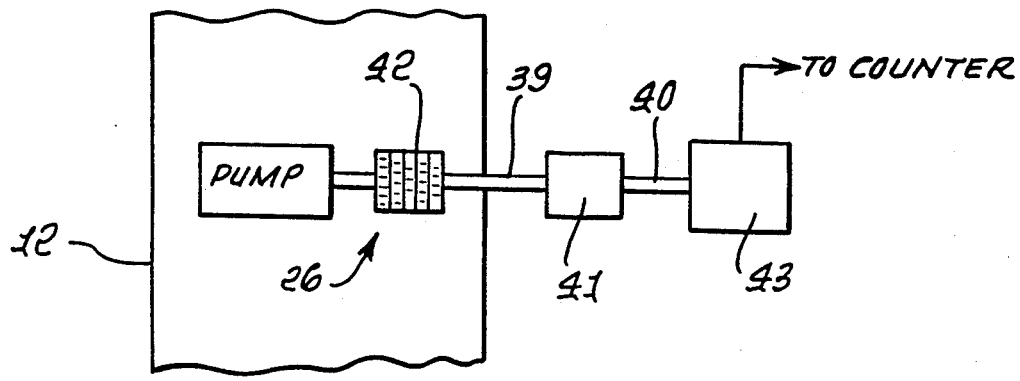

In accordance with the invention, and referring to FIGS. 1 and 3, the amount of fuel pumped at each dispenser is detected by pulser means $P_1$, $P_2$-$P_n$, whose outputs are transmitted at $P_1^1$, $P_2^1$ and $P_n^1$ to the interface means 33. Those outputs consist of a series of pulses generated as by a pulser having a rotary shaft 40 coupled at 41 to the shaft 39 of register wheel 42 at each dispenser. Wheel 42 rotates in proportion to the amount of fuel pumped and dispensed.

A detector 43 detects rotation of the shaft 40, i.e., counts its rotation (as for example by magnetic coupling of a fixed coil past which a magnet on the shaft travels as the shaft rotates, electric pulses then produced in the coil). Such a pulser is easily connected to an existing dispenser, as via coupling to a register shaft, as referred to.

The outputs $P_1^1$, $P_2^1$-$P_n^1$ are summed or combined as at 45 in FIG. 2, and transmitted to the interface means 33, which converts the combined pulses to an output $V_p^1(t_n)$, i.e., corresponding to the total volume of fuel pumped by the dispensers between times $t_o$ and $t_n$, corresponding to levels $L_o$ and $L_n$ as referred to above. Or, the interface unit 33 may directly receive pulse trains from each dispenser. In this regard, it may be assumed that fuel remains in lines 16-19, at all times.

The two outputs $V_m(t_n)$ and $V_p^1(t_n)$ of the interface means 33 may then be combined as at 80 and serially transmitted, in digital form, at 81 to a computer 50 which calculates the difference between them to arrive at a value $\Delta V_n$, error per tank for time interval $\Delta t$ which indicates, at time $t_n$, the total loss or leakage of fuel from the tank between times $t_o$ and $t_n$.

In this regard, the computer is programmed to provide the conversion function or factors referred to, so that the interface means 33 may then serve mainly to convert the pulse counts from the dispensers to a data stream $V_p^{11}(t_n)$, and combine that stream with the data stream $V_m^{11}(t_n)$ produced from the output $L(t_n)$ of the tank level detector, for serial transmission to the computer. Up to 48 samples of $\Delta V_n$ and $\Delta P_n$ can be recorded by the interface means.

Figure 4:
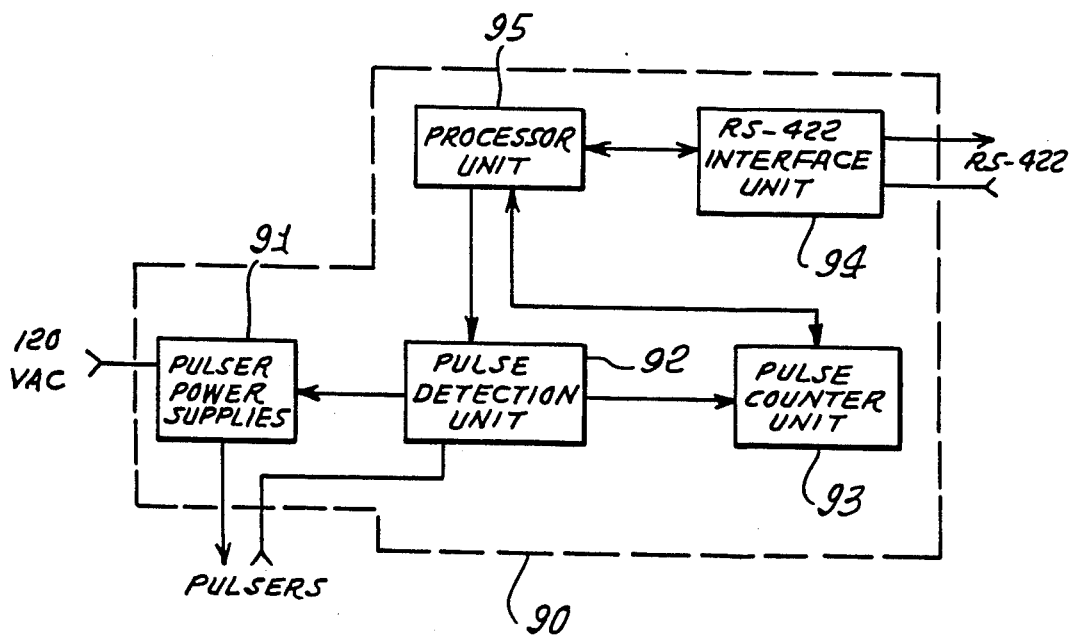

FIG. 4 shows in block diagram form the circuitry to process the pulses $P_1^1$, $P_2^1$-$P_n^1$. As shown, a pulse detection interface unit 90 consists of a pulser power supply subsystem 91, pulse detection and counting subsystem, and a data converter and transmission subsystem. The pulser power supply, pulse detection, subsystem 92 and counting subsystem 93 function together to count and accumulate pulses generated by the external pulser which is located on a fuel dispenser. These pulser units measure the mechanical rotation of the dispenser pump metering system and generate electrical current pulses indicating the product flow-rate. Such a system typically generates 1000 pulses per gallon of produce dispensed. The interface unit also collects data from on-site vapor monitoring systems via a logical voltage signal. These logical inputs may be connected to additional line-leak detectors or any sensing subsystem on the site that provides a logical voltage output. This data is relayed to the remote computer system. In this regard, the interface unit preferably has a battery-backed up, non-volatile memory to store data values.

The electrical communication link is shown on the block diagram as an E.I.A. (Electronic Industries Association) RS-422 Standard. This can be modified at the customers request to an E.I.A. RS232 communications Standard.

In FIG. 5 the more comprehensive electronic interface means or device 100 accumulates data received at 101 from fuel pumps, and received at 102 from a tank level monitor (TLM). Device 100 monitors sensor switches, and reports status and relays the accumulated data through an RS232 control interface 103. LEDs 104 on the device 100 front panel provide status and alarm information, and a printer 105 can be connected to the parallel port 106 for printed reports. Device 100 will also be referred to herein as an "EM24". The EM24 also accepts commands through the RS232 control port 107. Such commands initialize and configure the EM24, and request status information. Two alternate modes allow the control port to be patched to either the parallel port or the TLM interface.

Tank level input at 102 corresponds to $L(t_m)$ in FIG. 2; and pulser data from fuel dispenser, at 101, corresponds to $P_1^1$, $P_2^1$-$P_n^1$ in FIG. 2.

Figure 6A:
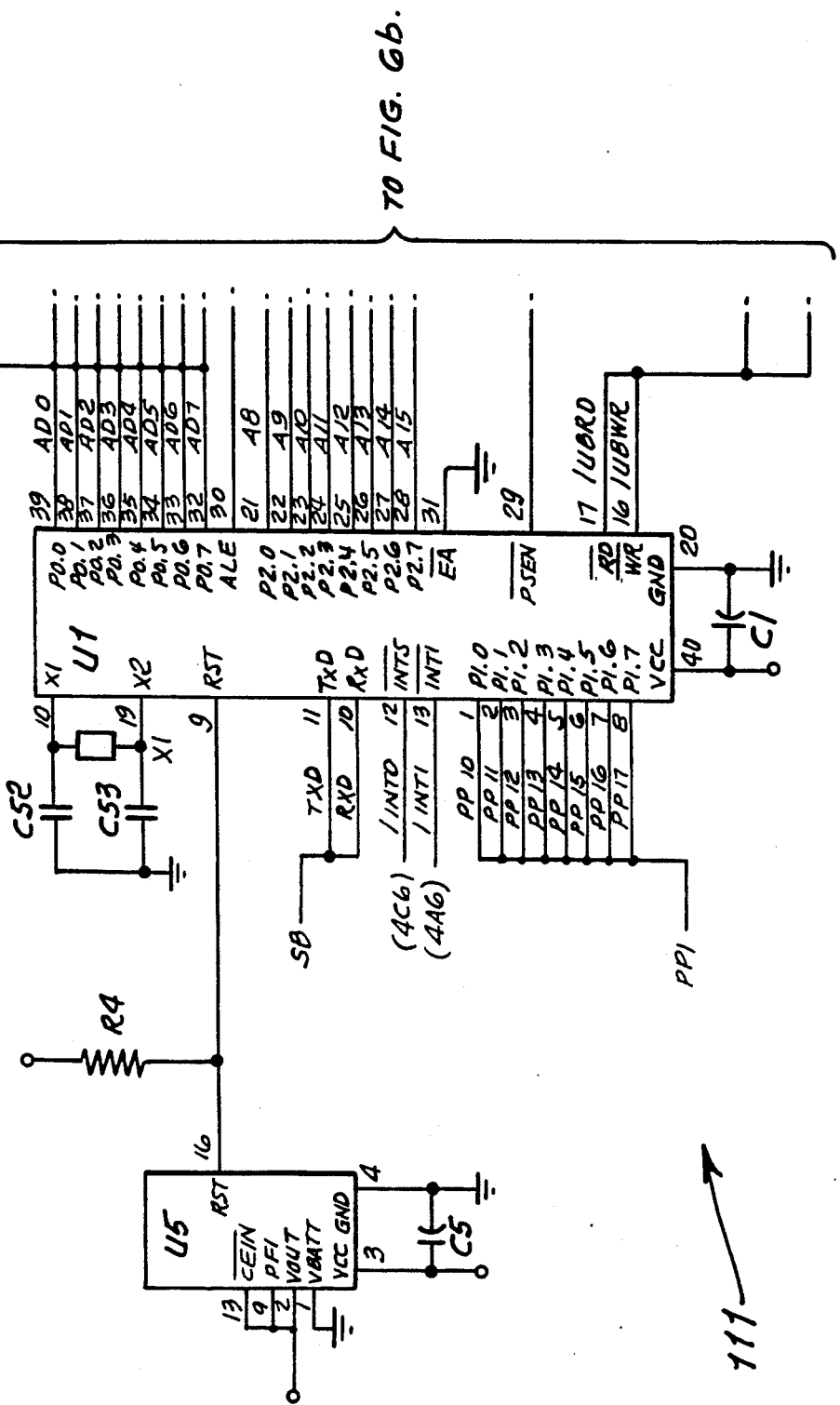
Figure 6B:
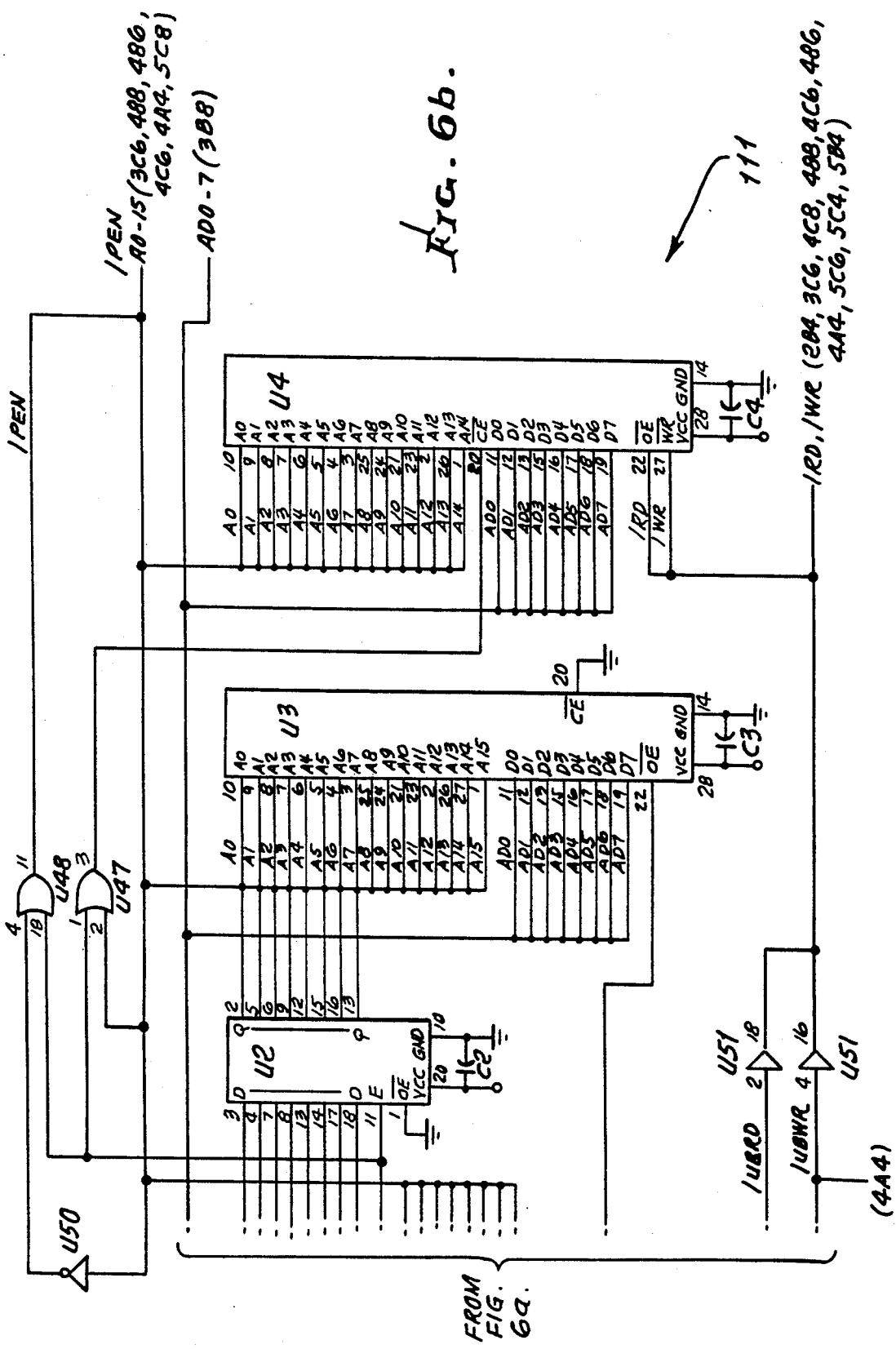
Figure 7B:
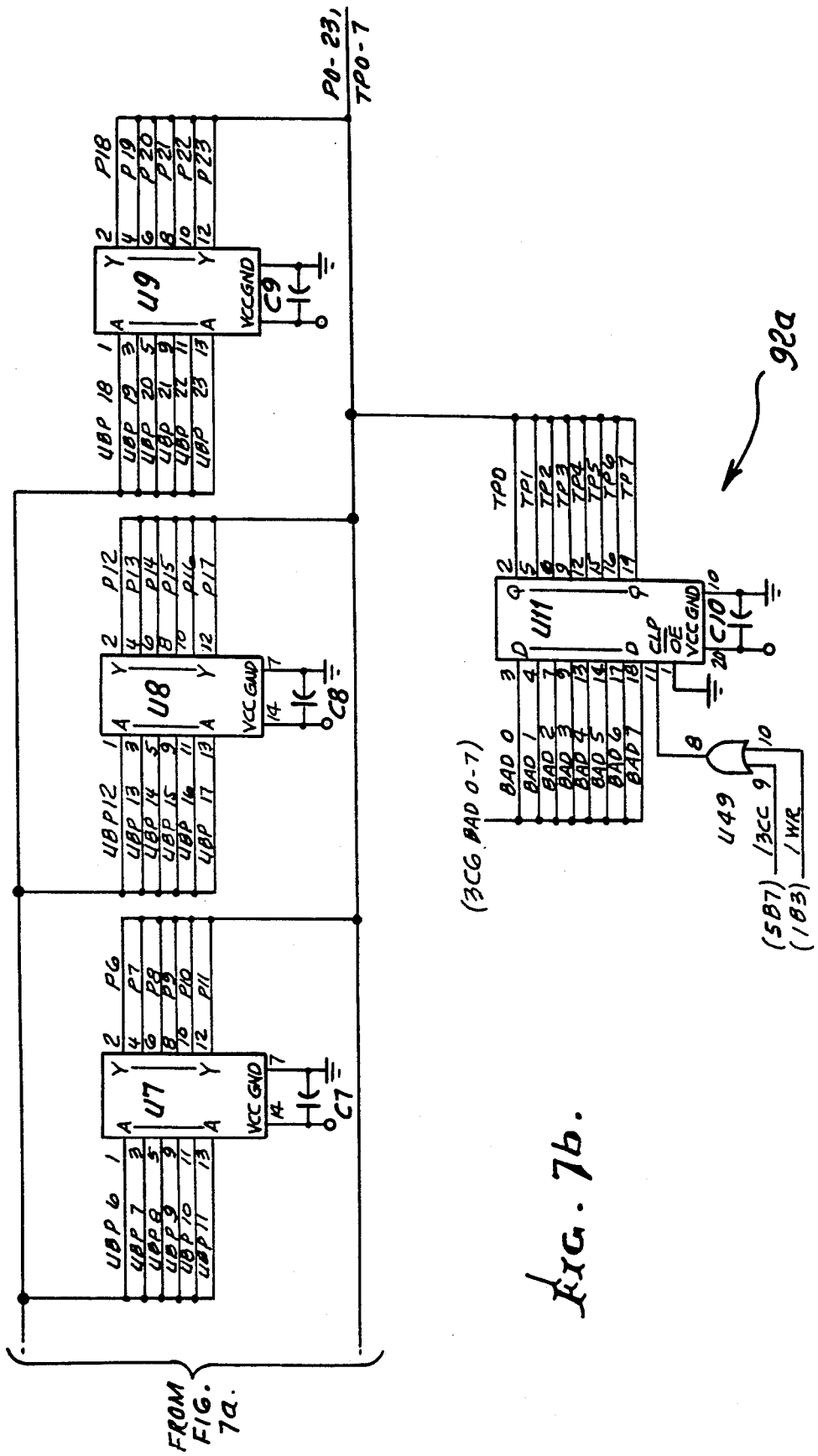

FIGS. 6A-12B are detailed circuit diagrams of the blocks as seen in FIG. 5. FIGS. 6A and 6B illustrate circuitry as found in processor unit 111; for example, FIGS. 7A and 7B show circuitry as found in pulser I/F block 92 in FIG. 5, and 92a refers to an associated processor in that block. FIG. 8 illustrates detailed circuitry as found in sensor I/F block 130 of FIG. 5 (tank level sensor inputs 131 are also seen in FIG. 5).

Figure 9A:
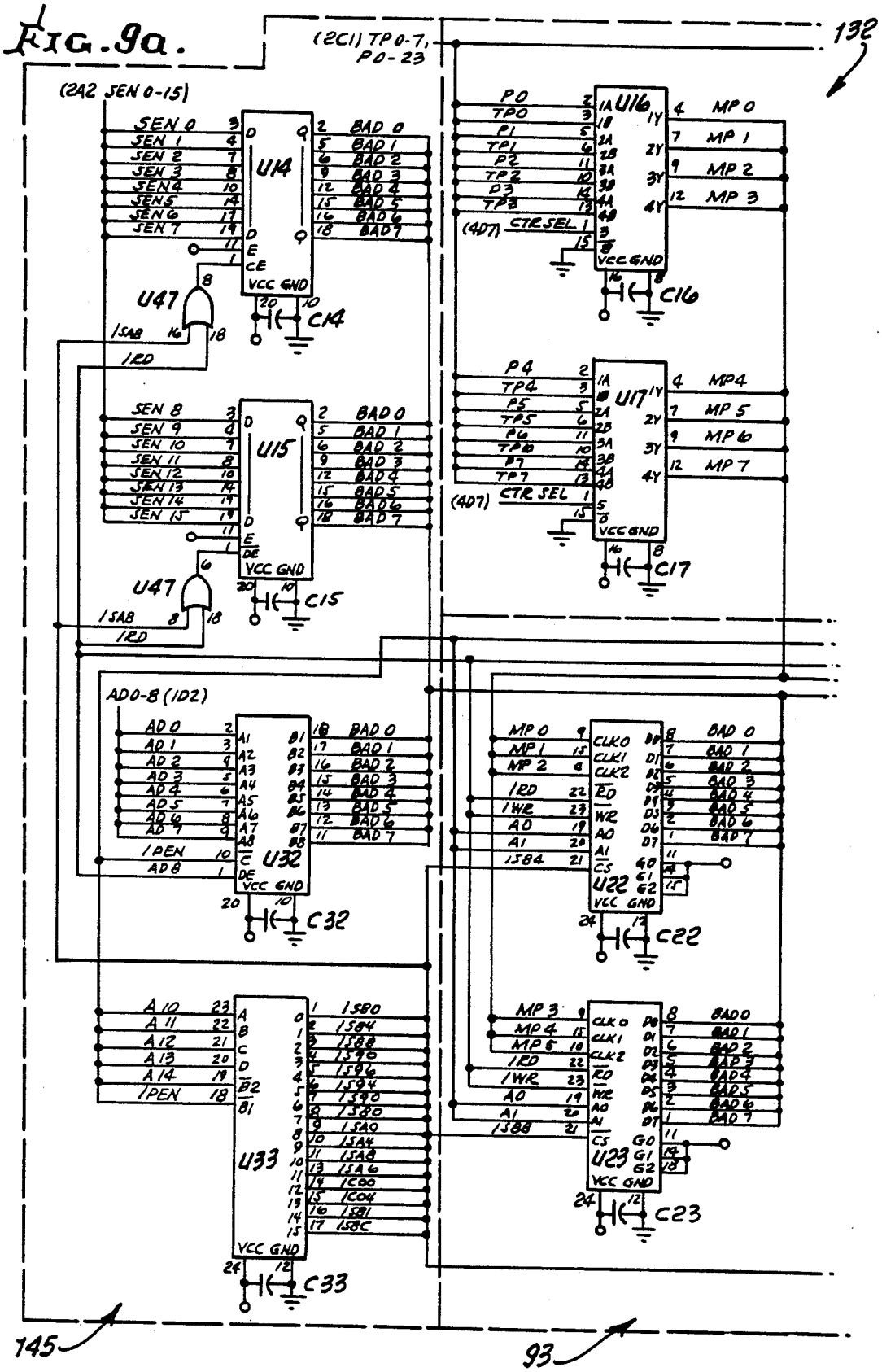
Figure 9C:
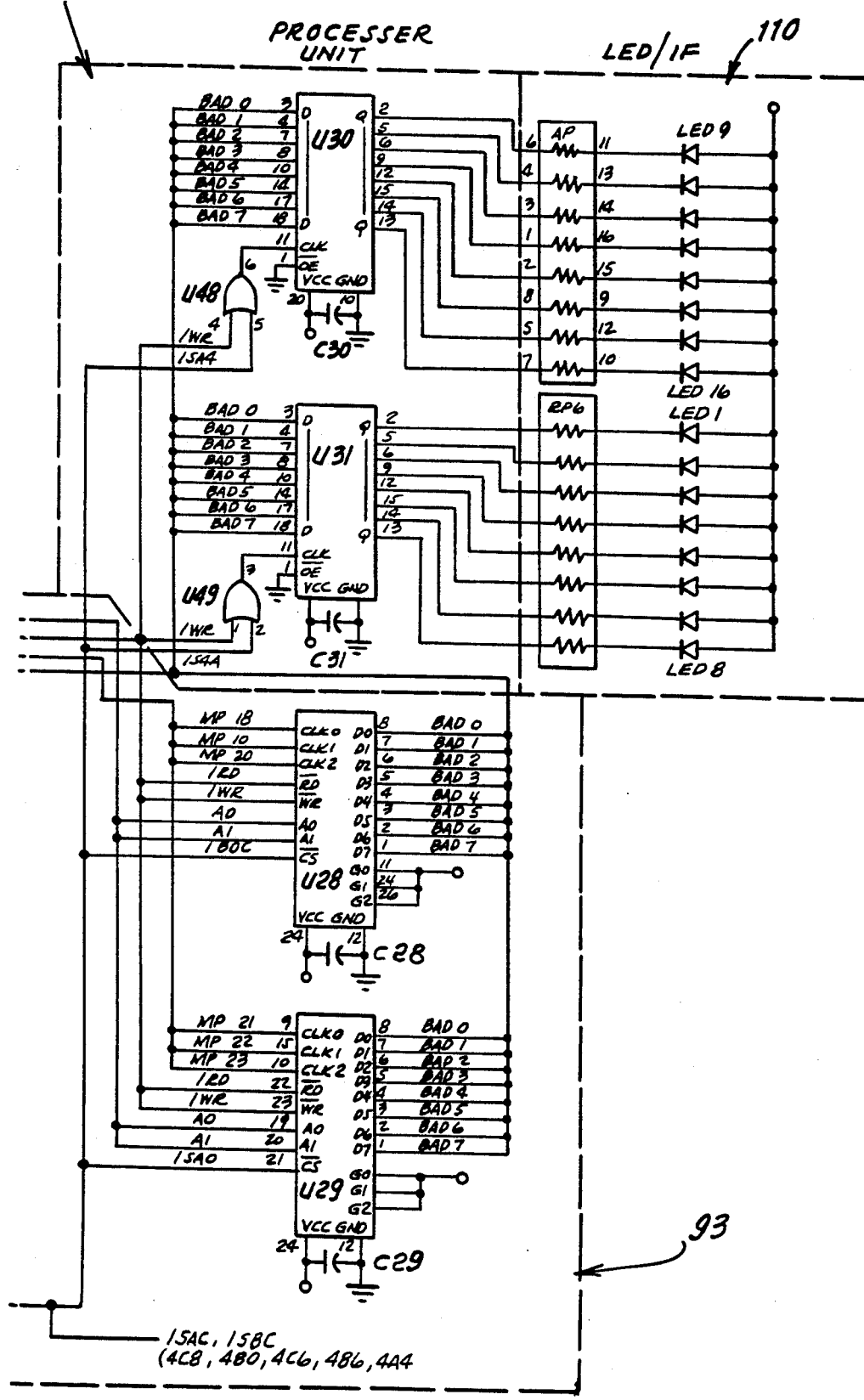

FIGS 9A-9C illustrates detailed circuitry as found in the test multiplexer 132 of FIG. 5, and as found in the pulse counter 93 seen in FIG. 5. Also seen in FIGS. 9A-9C are associated circuitry including processor 140 coupled to 93, and processor 141 coupled to 93, 140 and 132. See also LED I/F 110, as also appears in FIG. 5.

Figure 10A:
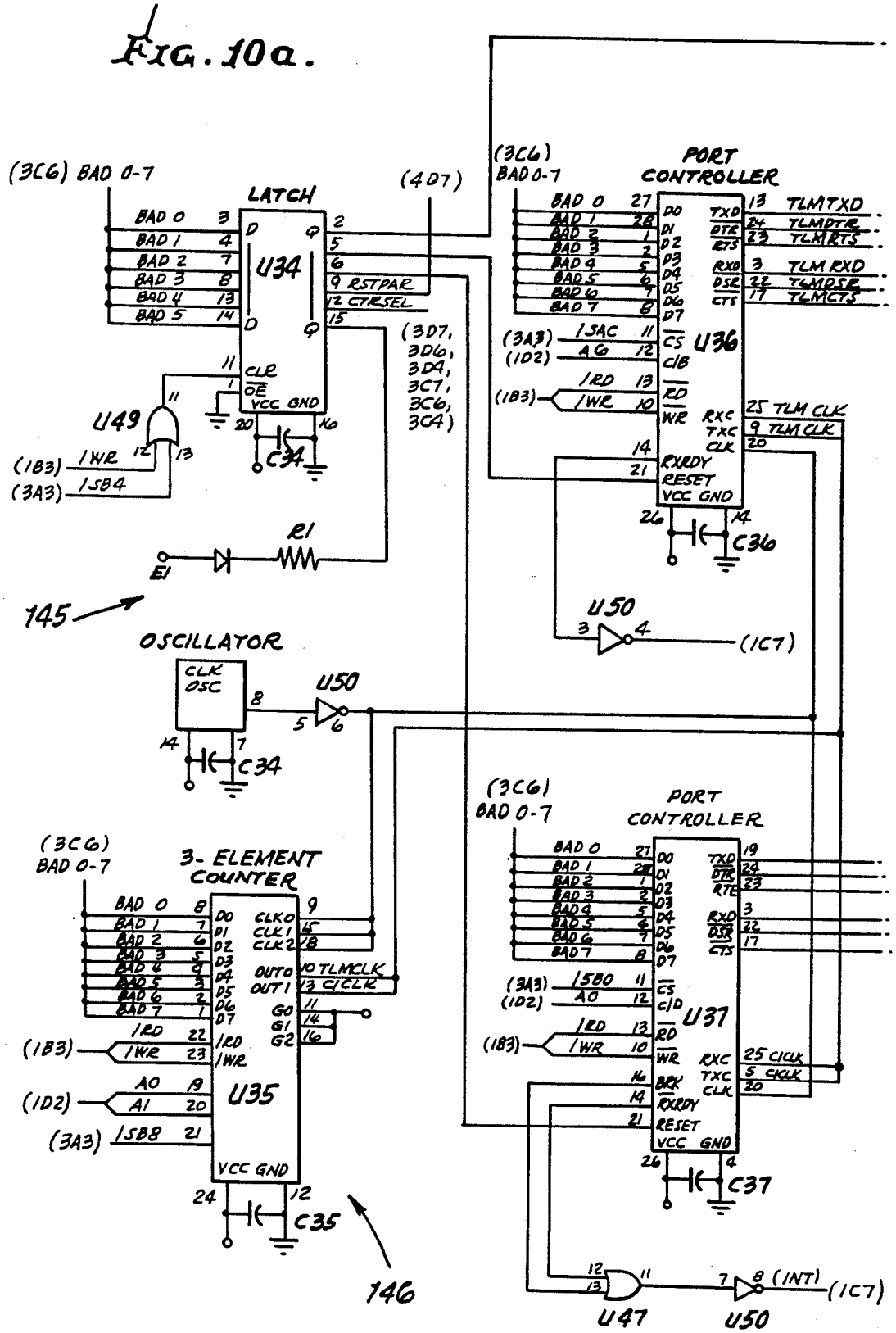
Figure 11:
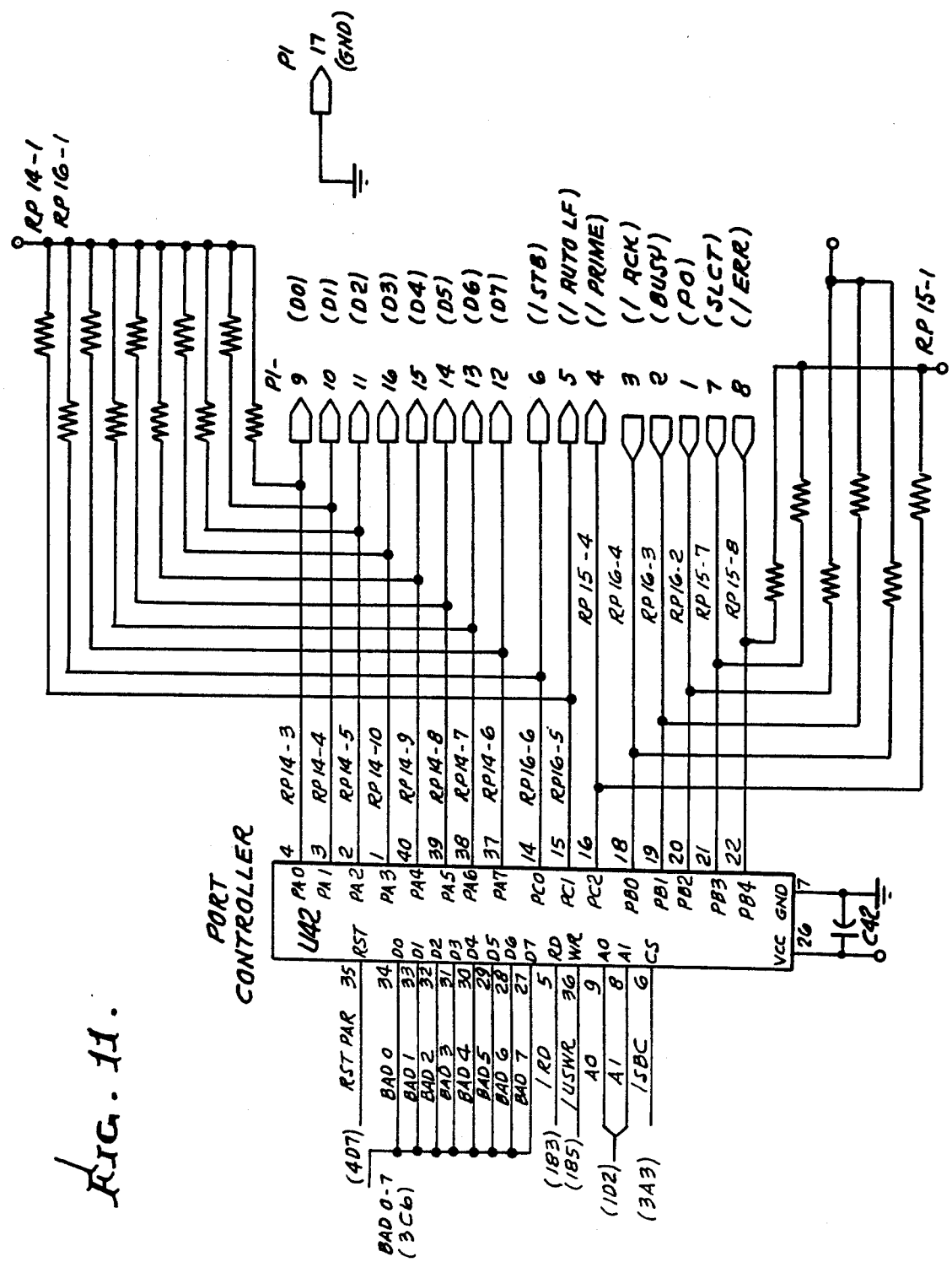

FIG. 10A and 10B illustrate detailed circuitry as found in the TLM Serial I/F block 143, as seen in FIG. 5, and as found in the Control Serial I/F block 144, as seen in FIG. 5. Also shown are associated processor circuitry 145, and associated circuitry at 146 (counter and oscillator). FIG. 11 illustrates detailed circuitry as found in Parallel I/F block 145, as seen in FIG. 5.

Figure 12A:
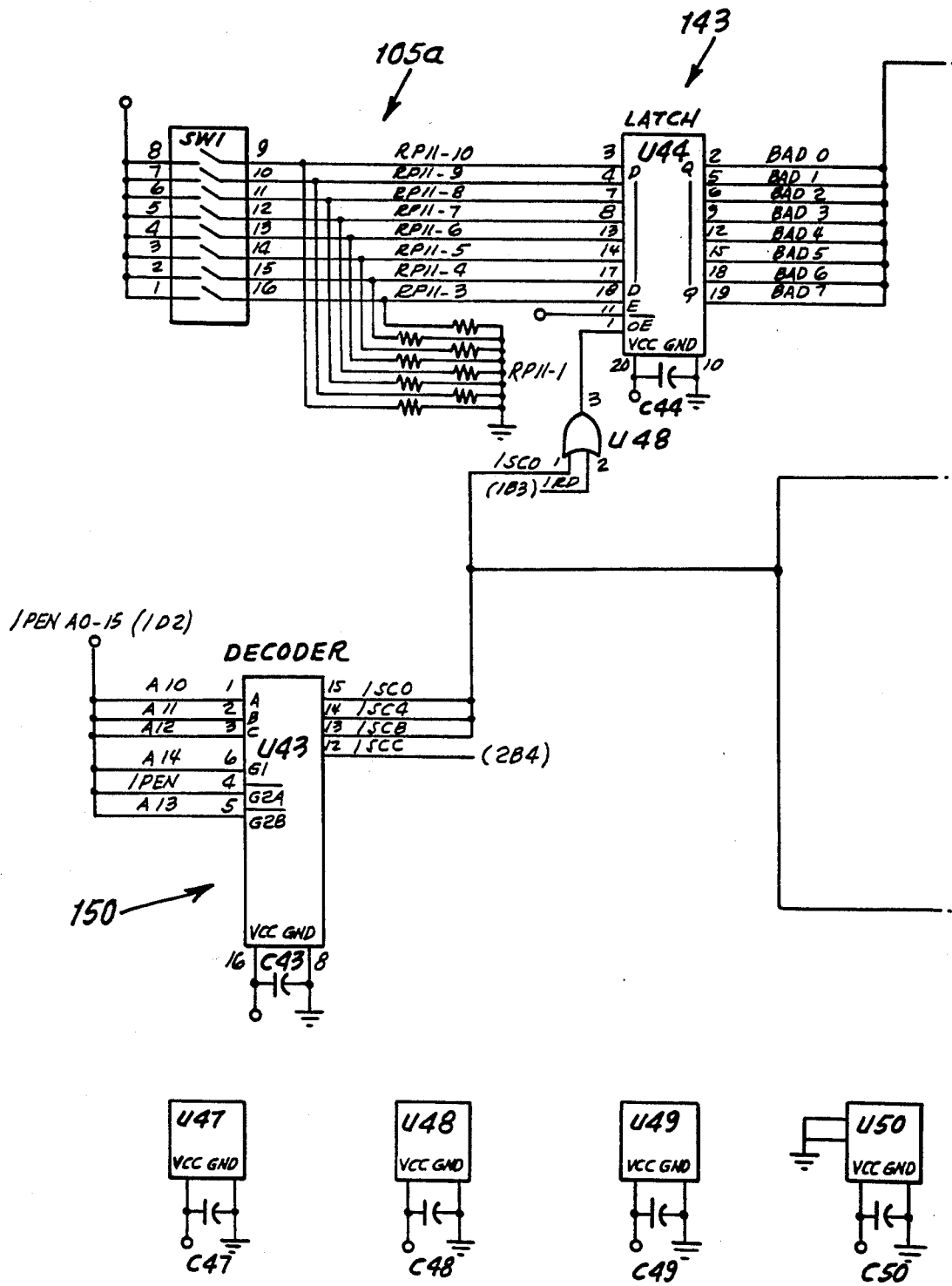

FIGS. 12A and 12B illustrate detailed circuitry as found in the Equipment ID Unit block 105, as seen in FIG. 5. Such circuitry includes sub-blocks 105a, b, and c in FIGS. 12A and 12B. See also associated processor units 147-150.

ACCUMULATED DATA

The EM24 accumulates data over a configurable or selected recording period. For each recording period, the EM24 collects final gross and net fuel volumes in tank 10, the average fuel temperature in the tank when the TLM31 measured the tank level, (see temperature sensor 107 in tank 10 in FIG. 1) the volumes of fuel deliveries received (see fuel input sensor 108 in FIG. 1) during the recording period, and the volume of fuel dispensed during the period (as derived from pulser input at 101), and the water level in the tank. The EM24 relates all data collected to a tank number, and stores one record for each tank 10 at the end of each recording period. In this regard, multiple tanks 10 can be provided. Each record also contains the time and date the data was collected. Note timer 110 associated with processor 111. The EM24 retains the records of the latest 48 recording periods, and allows access to these records through the control interface.

Fuel Pump Interface

From each fuel pump interface, the EM24 collects information to determine the quantity of fuel dispensed. Each fuel pump provides an electronic pulse output. See for example dispenser pumps 20–22 in FIG. 1. The number of output pulses (as at $P_1^1$, $P_2^1$, $P_n^1$) is proportional to the quantity of fuel dispensed from each hose, and the EM24 counts the pulses and converts the count to volume. A hose table, input via the control interface, associates each hose with up to two tanks (For each hose, the EM24 accepts two tank numbers and a percentage to support blending dispensers.) The EM24 records the volume dispensed from each tank for a period specified by command from the control interface. See control port 107.

The EM24 may take two forms EM24-1 or EM24-2 that differ only in the interface to the hoses. The EM24-1 interfaces to pumps that provide 12-volt pulses, and the EM24-2 interfaces to pumps that provide the presence and absence of a connection between two points to form pulses. The EM24 fuel pump interface electrical specifications are given in Tables 1 and 2.

The EM24 for example monitors fuel dispensed from as many as 24 individual fuel hoses. Each hose interface typically generates up to, but no more than, 65,535 pulses in any 10 second period. During a recording period, the EM24 records up to, but no more than, 16,777,215 pulses for any hose, and up to, but no more than, 94,967,295 pulses for any tank, by way of example.

Control Interface

The EM24 control interface receives commands that configure and control the EM24, and transmits acknowledgements and responses to these commands, as via RS232 port 107. The default configuration of the port—1200 baud, no parity, 8 data bits, 1 stop bit—can be changed by command. In addition, the baud rate changes on receipt of the BREAK signal, to allow a modem with a fixed baud rate to establish communications. The baud rate cycles through 300, 1200, and 2400 baud, changing once each time the BREAK is detected. The EM24 control interface can operate either half-duplex or full-duplex, i.e., it can be configured either to echo or to not echo each character it receives. The default setting is half-duplex.

The EM24 control interface operates in four different modes. The first mode, the login mode, is the idle mode of the interface. The second mode, the command mode, is the main operating mode of the interface. In this mode, the interface receives commands and transmits responses. The third mode, the tank level monitor conversational mode, patches the control interface to the TLM interface, to allow direct control of the TLM from the control interface. The final mode, the parallel port pass-through mode, allows the control port to transmit data to the parallel port, normally for printing by an attached printer.

Login Mode

The login mode provides a means of preventing unauthorized access to the EM24. This mode is entered on restart, on command, and after the interface has been idle in another mode for more than 15 minutes. For example, when the EM24 receives a six-digit code, followed by a carriage return and an optional line-feed (OD OA), the device compares the code to a six-digit code presented by a set of DIP switches mounted on the EM24 processor card. If the codes match, the EM24 control interface switches to the command mode. If the codes do not match, or if any other carriage-return terminated input is received, the EM24 responds by transmitting a carriage-return, line-feed, and a "login: " prompt. The EM24 operates as a half-duplex interface in the login mode, so that the six-digit code is not displayed on a user terminal connected to the control interface.

Command Mode

The EM24 control interface enters the command mode after receipt of the required code in the login mode, or on return from the TLM conversational mode or parallel port pass-through mode. The command mode recognizes two command formats, one for single-line commands and status requests, and another for multi-line commands. When the EM24 receives a valid single-line command, it executes the command and then responds by transmitting a ">" character. The ">" character acts as the command mode prompt. For status requests, the EM24 transmits the status information, followed by the prompt character. For multi-line commands, the EM24 transmits a carriage return after it receives each intermediate line, and the ">"prompt after it receives the last line. On receipt of an invalid or unrecognizable command, the EM24 transmits a "???", a carriage-return, and then for single-line commands, the prompt. The general formats for single-line commands and status requests are as shown in Table 2-1. Table 3 describes the formats for the multi-line commands. Appendix A shows the command codes and the parameters required for each individual command. Appendix C presents a summary of these commands The fields returned for the status responses are as described in Appendix B.

For both command formats, the EM24 control interface treats the Ctrl-H and Ctrl-? characters as backspace indicators, and removes the previous character from the command string, until a carriage return or the beginning of the string is encountered. In full-duplex mode, the EM24 transmits a backspace, a space, and a backspace on the receipt of a backspace indicator. Except for mode-conversion commands, the EM24 converts all lower-case alphabetic characters to upper case. Also, the EM24 maintains a type-ahead buffer, to allow a command to be entered while another is being processed.

Tank Level Monitor Port Setup Command

This command causes the EM24 to configure the TLM port. The command parameters provide any or all of the following: baud rate, type of parity, parity enable/disable, number of data bits, number of stop bits, and interface type. If the type of interface (RS232 or RS422) is specified, the EM24 selects which of the two connectors (DB-25 or DB-9) provided for that interface will be used.

The characteristics of the port which are not specified in a particular command are not changed in response to that command.

Control Port Setup Command

This command causes the EM24 to configure the RS232 control port. The command parameters provide any or all of the following: baud rate, type of parity, parity enable/disable, number of data bits, number of stop bits, and duplex. The characteristics of the port which are not specified in a particular command are not changed in response to that command. The baud rate of this port also changes, on receipt of a BREAK signal of the port, as described above, under "Control Interface".

Set Hose Table Command

The EM24 associates each fuel pump interface with either one fuel tank, or two tanks and a percentage, as specified by this command. The hose table command is a multi-line command, accepting one hose association per command line. Acceptable values for the hose number are 0 through 23, and for the tank number, 1 through 7. The command may provide the associations in any order, and a single command can provide any number of associations. The EM24 uses the last association received for each hose for data accumulation. Data accumulation is enabled for a hose when a tank association is received for the hose.

Set Date/Time Command

The EM24 contains a clock/calendar device to timestamp data as it is collected. A power (battery) source maintains the date and time through power losses. This command initializes the time and date.

Set Pulses/Gallon Command

The EM24 counts pulses received at the fuel pump interfaces and converts the number of pulses to volume, using a pulses/gallon conversion factor. This command sets that conversion factor.

Set TLM Polling Interval Command

The EM24 periodically polls the TLM to gather tank volume information. The EM24 also records the volume dispensed through the pump interfaces for each tank each time it polls the TLM. This command specifies the time the next TLM poll should occur, and the period between polls. The EM24 requires both parameters to be specified for this command.

Select LED Usage Command

The EM24 front panel contains sixteen green Light-Emitting Diodes (LEDs). This command selects the LED mode, as follows:
  Mode 1: LEDs reflect conditions of corresponding sensors.
  Mode 2: LEDs reflect conditions of first sixteen hose interfaces.
  Mode 3: LEDs are set on command from the control interface.
  Mode 4: LED's reflect conditions of last sixteen hose interfaces.

Write LED Command

If the EM24 has enabled the LEDs for manual control when it receives the Write LED command, the EM24 lights its front-panel LEDs according to the 16-bit hexadecimal parameter. If the parameter is not included in the command, or if the LEDs are not in manual mode, the EM24 considers the command invalid and does not change the LEDs. The least significant bit of the parameter corresponds to LED 0; the most significant, LED 15. If the bit is set to 1, the LED is turned on; if it is set to 0, the LED is turned off.

Alarm LED Control Command

This command accepts a parameter that instructs the EM24 to light the red alarm LED when an alarm condition is detected (mode 1), turn the LED on (mode 2), or turn the LED off (mode 3).

Fuel Pump Interface Control Command

The EM24 enables or disables the specified fuel pump interface on receipt of this command. When an interface is enabled, the EM24 accumulates dispensed volume data from the interface. No data is accumulated for an interface when it is disabled. Note that a fuel pump interface is enabled on receipt of a tank association for that fuel pump. (See Set Date/Time Command)

Select TLM Conversational Mode Command

The EM24 control interface switches to TLM conversational mode on receipt of this command. This mode is described below under "Tank Level Monitor Conversational Mode".

Select Parallel Port Pass-Through Mode Command

The EM24 control interface switches to Parallel Port Pass-Through mode on receipt of this command. See following section entitled "Parallel Port Pass-Through Mode".

Warm Start Command

If the parameter of this command matches the six-digit login code, the EM24 begins its warm start procedure. The EM24 resets all internal tasks to idle, restarts all internal periodic tasks, clears all receive and transmit buffers, and marks the current data accumulation cycle invalid. The EM24 control interface switches back to login mode at the conclusion of the warm start procedure.

Cold Start Command

On receipt of the Cold Start command with a valid six-digit login code, the EM24 begins its cold start procedure. The EM24 clears all memory, sets all configurable parameters to their default values, reads the clock, and then executes the warm start procedure.

Sensor Status Request

In response to this command, the EM24 reads its sixteen sensors and returns their status in a message through the control interface. Appendix B shows the format of the response.

Hose Table Status Request

The EM24 transmits a Hose Table Status message through the control interface in response to this command. See Appendix B for format of the response.

Setup Status Request

The Setup Status response message, which the EM24 generates on receipt of the Setup Status Request message, reports the status of all configurable parameters except the hose table. Appendix B shows the format of the response.

Accumulated Data Request

This command causes the EM24 to generate an Accumulated Data Response and transmit it through the control interface. If the command parameter is "ALL", the EM24 counts all valid data records retained by the EM24 to determine which to report. (The EM24 keeps as many as forty-eight records, but a cold start destroys these records.) If the command parameter is "DAY", the EM24 includes only accumulated data records with the previous day's date in determining the record to include in the response. The command is considered invalid if the parameter is neither "ALL" nor "DAY". The Accumulated Data Response format is shown in Appendix B.

Computer-Format Accumulated Data Request

This command is identical to the Accumulated Data Request, except the response is presented in a format more easily read by computers. The Computer-Format Accumulated Data Response format is shown in Appendix B.

Logout Command

This command changes the control port from the command mode to the login mode.

Corrupt Restart Code Command

This command causes the EM24 to corrupt its restart code, to force the next power restart to be a cold restart.

Diagnose Counters Command

This command exercises the counters used to collect fuel dispenser sales data. The command takes two parameters, a hexadecimal count and a clear flag. If the clear flag is a '1', the counters are cleared before the test begins, otherwise they are not. The counters are switched to the test inputs, and then clocked the requested number of times. The command then reads the counters and displays their results. At the end of the test, the counters are switched back to the dispenser inputs. Use of this command will cause invalid dispenser data to be recorded for the period.

Set Tank Manifolding Command

This multi-line command allows tank manifolding to be entered. Each line should represent one manifolded group. As many as eight tanks can be specified on one line. The EM24 uses the manifolding setup in determining gross reconciliation errors. In reporting these errors, the EM24 specifies only the lowest-numbered tank.

Clear Tank Manifolding Command

The clear tank manifolding command is a multi-line command used to remove tanks from their manifolding group. As many as eight tanks ma be specified on a single line.

Manifolding Status Request

The command causes the EM24 to return the manifolding status of all tanks. The format of the Manifolding Status response message is described in Appendix B.

TLM-Specific Format Command

This command is used to specify which TLM is used, and those parameters specific to that TLM. The only TLM currently supported by the EM24 is the Veeder-Root TLS-250. This tank monitor uses an optional security code. This command specifies whether the security code is to be used, and if so, also the security code. The format for this command is described in Appendix A.

Tank Level Monitor Conversational Mode

The EM24 control interface enters the TLM Conversational mode when the EM24 receives the select TLM Conversational Mode Command (see above). In this mode, the EM24 transfers each byte received on the control interface to the TLM port, and each byte received on the TLM port to the control interface. The EM24 does not collect level information from the TLM when the control interface is in TLM Conversational mode. The receive logic monitors the incoming data for the De-Select TLM Conversational Mode Command, described in Appendix A. When the De-Select command is received, the EM24 switches the control interface back to command mode.

Parallel Port Pass-Through Mode

When the EM24 receives the Select Parallel Port Pass-Through Mode Command (see above) on the control interface, it begins transferring all data received at the control port to the parallel port. No other EM24 process transfers data to the parallel port when the control port is in the parallel port pass-through mode. The control interface returns to command mode when the receive logic detects the De-Select Parallel Port Pass-Through Mode Command in the incoming data stream. Appendix A contains a description of the De-Select command format.

Parallel Port Interface

A printer is normally connected to the EM24 parallel port, through which the EM24 relays reports of catastrophic events. The parallel port interface can also be patched to the control port, as described in the above section, "Parallel Port Pass-Through Mode".

Table 4 depicts the signals used on this port. All signals use TTL logic levels. For each byte to be output on the port, the EM24 reads the port status. If the Busy signal is low, the EM24 writes the byte to the port, and then, at least 0.5 microseconds later, outputs a low pulse on the /Strobe signal. The /Strobe pulse remains low for at least 1.0 microsecond, and the data byte remains on the port lines for at least 0.5 microseconds after the /Strobe line returns high.

To output data on the parallel port, the EM24 first writes the data to a 4800-byte buffer. The EM24 periodically checks the status of the Busy signal, and transmits a character, as described above if the buffer is not empty. If the control port is in parallel port pass-through mode and the buffer fills to 3840 bytes, the EM24 sends an XOFF character (hexadecimal 13) through the control port. The EM24 sends an XON character (hexadecimal 11) when the buffer subsequently empties to 2880 bytes. If the buffer is full when a byte is received, the byte is discarded.

Sensor Interface

Sixteen switch-closure sensors can be connected to the EM24 sensor interfaces. The EM24 checks each sensor connection once every 5 minutes, and records the current status in memory. The sensor status can be reflected on the green front-panel LEDs, as described in Sections "Select LED Usage Command" and "Write LED Command", and it is reported in response to the above Sensor Status Request. The sensor interface electrical specifications are as specified in Tables 5 and 6.

Light-Emitting Diode Interface

The EM24 front panel contains sixteen green LEDs. The LEDs can be used to reflect the conditions of the sensor inputs or the conditions of the first sixteen fuel pump interfaces, or they can be set directly by command from the control interface. Sections "Select LED Usage Command" and "Write LED Command" describe the commands used to set the modes and to manually set the LEDs.

TABLE 1

EM24 PUMP INTERFACE
Absolute Maximum Ratings

| | |
|---|---|
| $V_{il}$ | -3 V |
| $V_{ih}$ | 88 V |
| $I_{ih}$ | 40 mA |
| Max. Operating Temperature | 100 °C |
| Min. Operating Temperature | 0 °C |

TABLE 2

EM24 PUMP INTERFACE
Switching Characteristics, 25°C

| | Min | Typ | Max | Units |
|---|---|---|---|---|
| $I_{il}$ | | -.005 | -100 | uA |
| $I_{ih}$ | | 5 | | mA |
| $V_{il}$ | | 0 | 6.4 | V |
| $V_{ih}$ | 7.8 | 12 | | V |
| $t_{high}$ | 100.0 | | | usec |
| $t_{low}$ | 100.0 | | | usec |

SINGLE-LINE COMMAND FORMAT

Ctrl-Acmd<CR>

Where  Ctrl-A is the ASCII character, hexadecimal digit 01, cmd is the command code and any parameters, as defined in Figure 5 below, and <CR> is the carriage-return terminator, with an optional line-feed character, hexadecimal digits 0D, 0A.

TABLE 2-|

Single-Line Command and Status Request Format

MULTI-LINE COMMAND FORMAT

```
Ctrl-Bcmd-code<CR>
    cmd-data<CR>
    cmd-data<CR>
    cmd-data<CR>
        ...
    cmd-data<CR>
    Ctrl-B<CR>
```

Where  cmd-code is the command identifier, defined in Figure 5 below, cmd-data is a command parameter, also defined in Figure 5 below, and <CR> is the carriage-return terminator, with an optional line-feed character, hexadecimal digits 0D, 0A.

TABLE 3

Multi-Line Command Format

| EM24 | | Printer |
|---|---|---|
| | /Strobe | |
| 1 | :---------------------------->: | |
| | Data Bit 0 | |
| 2 | :---------------------------->: | |
| | Data Bit 1 | |
| 3 | :---------------------------->: | |
| | Data Bit 2 | |
| 4 | :---------------------------->: | |
| | Data Bit 3 | |
| 5 | :---------------------------->: | |
| | Data Bit 4 | |
| 6 | :---------------------------->: | |
| | Data Bit 5 | |
| 7 | :---------------------------->: | |
| | Data Bit 6 | |
| 8 | :---------------------------->: | |
| | Data Bit 7 | |
| 9 | :---------------------------->: | |

```
        15                                    16
    :        /Acknowledge              :
 10 :<--------------------------------;
    :        Busy                      :
 11 :<--------------------------------;
    :        Paper Out                 :
 12 :<--------------------------------;
    :        Select                    :
 13 :<--------------------------------;
    :        /Auto Feed                :
 14 :-------------------------------->:
    :        /Error                    :
 15 :<--------------------------------;
    :        /Init Printer             :
 16 :-------------------------------->;
    :        /Select Input             :
 17 :-------------------------------->:
    :        Ground                    :
18-25:-------------------------------->:
    :                                  :
```

TABLE 4

PARALLEL PORT INTERFACE

TABLE 5

EM24 SENSOR INTERFACE
Absolute Maximum Ratings

| | |
|---|---|
| $I_{i-close}$ | 40 mA |
| Max. Operating Temperature | 100 °C |
| Min. Operating Temperature | 0 °C |

TABLE 6

EM24 SENSOR INTERFACE
Switching Characteristics, 25°C

| | Min | Typ | Max | Units |
|---|---|---|---|---|
| $I_{i-close}$ | | 5 | | mA |
| $V_{o-open}$ | | 12 | | V |
| $t_{open}$ | 4 | | | Min |
| $t_{close}$ | 4 | | | Min |

APPENDIX A
Control Interface Command Formats

Tank Level Monitor Setup Command

Format:

Ctrl-A01,baud,partype,parena,data,stop,rstype<CR>

Parameters:

baud:    Baud Rate
                  Field Width: 3 or 4 decimal digits
                  Valid Values: 300, 1200, 2400
                  Default: 1200 partype:  type of parity
                  Field Width: 3 or 4 characters
                  Valid Values: ODD, EVEN
                  Default: EVEN parena:   parity enable
                  Field Width: 2 or 3 characters
                  Valid Values: ON, OFF
                  Default: OFF data:     number of data bits
                  Field Width: 1 decimal digit
                  Valid Values: 7,8
                  Default: 8 stop:     number of stop bits
                  Field Width: up to 3 decimal digits
                  Valid Values: 1, 1.5, 2
                  Default: 1 rstype:   port type
                  Field Width: 5 characters
                  Valid Values: RS232, RS422
                  Default: RS422

Notes: Parameters may appear in any order. All parameters are optional, but at least one must be specified.

Control Port Setup Command

Format:

Ctrl-A02,baud,partype,parena,data,stop,dux<CR>

Parameters:

baud:    Baud Rate
                  Field Width: 3 or 4 decimal digits
                  Valid Values: 300, 1200, 2400, 9600
                  Default: 1200 partype: type of parity
Field Width: 3 or 4 characters
Valid Values: ODD, EVEN
Default: EVEN parena: parity enable
Field Width: 2 or 3 characters
Valid Values: ON, OFF
Default: OFF data: number of data bits
Field Width: 1 decimal digit
Valid Values: 7,8
Default: 8 stop: number of stop bits
Field Width: up to 3 decimal digits
Valid Values: 1, 1.5, 2
Default: 1 dux: full- or half-duplex specification
Field Width: 4 characters
Valid Values: FULL, HALF
Default: HALF Notes: Parameters may appear in any order. All parameters are optional, but at least one must be specified.

Set Date/Time Command

Format:
        Ctrl-A03,MM/DD/YY,HH:MI<CR>

Parameters:

MM: month
Field Width: 2 decimal digits
Valid Values: 1-12
Default: 1

DD: day
Field Width: 2 decimal digits
Valid Values: 1-31
Default: 1

YY: year
Field Width: 2 decimal digits
Valid Values: 00-99
Default: 89

HH: hour
Field Width: 2 decimal digits
Valid Values: 00-23
Default: 00

MI: minute
Field Width: 2 decimal digits
Valid Values: 00-59
Default: 00

Notes: Both date and time must be specified, and must be present in the order shown.

Set Pulses/Gallon Command

Format:
Ctrl-A04,ppg<CR>

Parameters:

ppg: pulses per gallon
Field Width: 1-5 decimal digits
Valid Values: 1-99999
Default: 100

Notes: Parameter is required.

Set TLM Polling Interval Command

Format:
Ctrl-A05,starthr:startmin,period<CR>

Parameters:

starthr: hour in which next TLM poll is to occur
Field Width: 2 decimal digits
Valid Values: 00-23
Default: 00 startmin: minute in which next TLM poll is to occur
Field Width: 2 decimal digits
Valid Values: 00-59
Default: 0 period: period between successive TLM polls, in minutes
Field Width: 4 decimal digits
Valid Values: 0-9999
Default: 60

Notes: Both parameters are required.

Select LED Usage Command

Format:
Ctrl-A06,ledmode<CR>

Parameters:

ledmode: mode of front panel LEDs
Field Width: 1 decimal digit
Valid Values: 1-3
Default: 1

Notes: Parameter is required.
Parameter values are as follows:
1: LEDs reflect sensor conditions
2: LEDs reflect conditions of first sixteen pumps
3: LEDs set on command from control interface default condition: all LEDs off
4: LEDs reflect conditions of last sixteen pumps

Write LED Command

Format:
       Ctrl-A07,ledset<CR>

Parameters:

ledset:   condition of front panel LEDs
             Field Width: 4 hexadecimal digits
             Valid Values: 0000-FFFF
             Default: 0000

Notes: Parameter is required. Least significant bit represents state of LED 0 (i.e., 0F21 turns on LEDs 0, 5, 8, 9, 10, and 11).

Alarm LED Control Command

Format:
       Ctrl-A08,almmode<CR>

Parameters:

almmode:  mode of front panel speaker
             Field Width: 1 decimal digit
             Valid Values: 1-3
             Default: 1

Notes: Parameter is required.
Parameter values are as follows:
1: LED on when EM24 detects an alarm
2: LED on
3: LED off

Fuel Pump Interface Control Command

Format:
       Ctrl-A09,pump,enable<CR>

Parameters:

pump:     fuel pump interface number
             Field Width: 2 decimal digits
             Valid Values: 0-20
             Default: none enable:   fuel pump interface enable flag
             Field Width: 1 decimal digit
             Valid Values: 0,1
             Default: 1

Notes: Both parameters are required. When enable is 1, the fuel pump interface is enabled, and data is collected from it.

Select TLM Conversational Mode Command

Format:
    Ctrl-A0A<CR>

Parameters: none

De-Select TLM Conversational Mode Command

Format:
    Ctrl-A0B,01<CR>

Parameters: none

Select Parallel Port Pass-Through Mode Command

Format:
    Ctrl-A0C<CR>

Parameters: none

De-Select Parallel Port Pass-Through Mode Command

Format:
    Ctrl-A0D,01<CR>

Parameters: none

Warm Start Command

Format:
    Ctrl-A0E,logcode<CR>

Parameters:

logcode: EM24 identifier code
            Field Width: 6 hexadecimal digits
            Valid Values: 000000-FFFFFF
            Default: none Notes: Parameter is required. Code is that used to change control port from login mode to command mode.

Cold Start Command

Format:
    Ctrl-A0F,logcode<CR>

Parameters:

logcode: EM24 identifier code
            Field Width: 6 hexadecimal digits
            Valid Values: 000000-FFFFFF
            Default: none Notes: Parameter is required. Code is that used to change control port from login mode to command mode.

Sensor Status Request

Format:
    Ctrl-A 10<CR>

Parameters: none

Hose Table Status Request

Format:
    Ctrl-A 11<CR>

Parameters: none

Setup Status Request

Format:
    Ctrl-A 12<CR>

Parameters: none

Accumulated Data Request

Format:
    Ctrl-A 13,amtflag,record<CR>

Parameters:

amtflag:  flag to indicate how record number is to be used
               Field Width: 3 characters
               Valid Values: ALL, DAY
               Default: none record:  indicates record to be returned.
               Field Width: 2 decimal digits
               Valid Values: 0 - 47
               Default: none Notes: Parameters are required. If the amtflag parm is ALL and record "n" is requested, the "nth" oldest record will be returned. If amtflag is DAY, then the "nth" oldest record with the previous day's date will be returned. Request is ignored if amtflag is other than ALL or DAY.

Logout

Format:
    Ctrl-A 14<CR>

Parameters: none

Corrupt Restart Code

Format:
    Ctrl-A 15,logcode<CR>

Parameters:

logcode:  EM24 identifier code
               Field Width: 6 hexadecimal digits

Valid Values: 000000-FFFFFF
Default: none

Notes: Parameter is required. Code is that used to change control port from login mode to command mode.

Diagnose Counters

Format:
    Ctrl-A16,count,clrflag<CR>

Parameters:

count: Hexadecimal count of clocks to be applied to counters.
        Field Width: 4 digits
        Valid Values: 0000 - FFFF
        Default: none clrflag: Indicates whether counters are to be pre-cleared.
        Field Width: 1 decimal digit
        Valid Values: 0 - 9
        Default: none Notes: Parameters are required.

Manifolding Status Request

Format:
    Ctrl-A17<CR>

Parameters: none.

Computer-Format Accumulated Data Request

Format:
    Ctrl-A18,amtflag,record<CR>

Parameters:

amtflag: flag to indicate how record number is to be used
        Field Width: 3 characters
        Valid Values: ALL, DAY
        Default: none record: indicates record to be returned.
        Field Width: 2 decimal digits
        Valid Values: 0 - 47
        Default: none Notes: Parameters are required. If the amtflag parm is ALL and record "n" is requested, the "nth" oldest record will be returned. If amtflag is DAY, then the "nth" oldest record with the previous day's date will be returned. Request is ignored if amtflag is other than ALL or DAY.

Set Hose Table Command

Format:
```
Ctrl-B80<CR>
hose,tanka,tankb,percent<CR>
hose,tanka,tankb,percent<CR>
...
hose,tanka,tankb,percent<CR>
Ctrl-B<CR>
```

Parameters:

- hose:    fuel pump interface number
           Field Width: 2 decimal digits
           Valid Values: 00-20
           Default: none

- tanka:   first (or only) fuel tank from which hose
              dispenses product
           Field Width: 1 decimal digit
           Valid Values: 0-7
           Default: integer part of hose/3

- tankb:   second fuel tank from which hose dispenses product
           Field Width: 1 decimal digit
           Valid Values: 0-7
           Default: integer part of hose/3

- percent: percent of total product dispensed that is
              drawn from tanka
           Field Width: 6 decimal digits
           Valid Values: 000.00-100.00
           Default: 100.00

Notes: From one to twenty-four hose/tank associations can be specified per command. The EM24 uses the last association specified for each hose.

The tankb and percent parameters are optional, but if one is specified for a particular hose, the other must also be specified.

Set TLM Format Command

Format:
```
Ctrl-B81<CR>
format<CR>
formparm,formparm,...formparm<CR>
formparm<CR>
...
formparm<CR>
Ctrl-B<CR>
```

Parameters:

- format:  TLM interface format code
           Field Width: 7 characters

Valid Values: TLS-250, TLS250 (1st Release)
Default: none formparm: format-specific parameter. For TLS-250 format, two parameters may be required. The first parm is '0' or another digit and indicates whether the security code is to be used. If the first parm is not '0', the second parm must be the 6-digit security code for the TLM.
First Field Width: 1 digit
Valid Values: Any ASCII character
Default: none
Second Field Width: 6 digits
Valid Values: Any ASCII characters
Default: none Notes: The format parameter must be specified.
Future releases will support other formats, which will require different parameters.

Clear Tank Manifolding

Format:
```
Ctrl-B82<CR>
tank,tank,tank,...tank<CR>
tank,tank,tank,...tank<CR>
...
tank,tank,tank,...tank<CR>
Ctrl-B<CR>
```

Parameters:

tank: Tank on which manifolding is to be cleared.
Field Width: 1 decimal digit
Valid Values: 1 - 8
Default: none Notes: As many as 8 tanks may be specified on one line.

Set Tank Manifolding

Format:
```
Ctrl-B83<CR>
tank,tank,tank,...tank<CR>
tank,tank,tank,...tank<CR>
...
tank,tank,tank,...tank<CR>
Ctrl-B<CR>
```

Parameters:

tank: Tank to be added to manifolded group
Field Width: 1 decimal digit
Valid Values: 1 - 8
Default: none Notes: As many as 8 tanks may be specified on one line.

APPENDIX B
Control Interface Status and Accumulated Data Response Formats

Sensor Status Response

Format:

```
;<CR>
;    Sensor  0:   state        Sensor  8:   state<CR>
;    Sensor  1:   state        Sensor  9:   state<CR>
;    Sensor  2:   state        Sensor 10:   state<CR>
;    Sensor  3:   state        Sensor 11:   state<CR>
;    Sensor  4:   state        Sensor 12:   state<CR>
;    Sensor  5:   state        Sensor 13:   state<CR>
;    Sensor  6:   state        Sensor 14:   state<CR>
;    Sensor  7:   state        Sensor 15:   state<CR>
;<CR>
```

Parameters:

state:    state of indicated sensor
               Field Width: 3 characters
               Valid Values: ON, OFF

Hose Table Status Response

Format:

```
;<CR>
;    Hose  0:  ht1,ht2,perc    Hose 12:  ht1,ht2,perc<CR>
;    Hose  1:  ht1,ht2,perc    Hose 13:  ht1,ht2,perc<CR>
;    Hose  2:  ht1,ht2,perc    Hose 14:  ht1,ht2,perc<CR>
;    Hose  3:  ht1,ht2,perc    Hose 15:  ht1,ht2,perc<CR>
;    Hose  4:  ht1,ht2,perc    Hose 16:  ht1,ht2,perc<CR>
;    Hose  5:  ht1,ht2,perc    Hose 17:  ht1,ht2,perc<CR>
;    Hose  6:  ht1,ht2,perc    Hose 18:  ht1,ht2,perc<CR>
;    Hose  7:  ht1,ht2,perc    Hose 19:  ht1,ht2,perc<CR>
;    Hose  8:  ht1,ht2,perc    Hose 20:  ht1,ht2,perc<CR>
;    Hose  9:  ht1,ht2,perc    Hose 21:  ht1,ht2,perc<CR>
;    Hose 10:  ht1,ht2,perc    Hose 22:  ht1,ht2,perc<CR>
;    Hose 11:  ht1,ht2,perc    Hose 23:  ht1,ht2,perc<CR>
;<CR>
```

Parameters:

ht1:    first (or only) tank from which indicated hose
               dispenses fuel
               Field Width: 1 decimal digit
               Valid Values: 0-7 ht2:    second tank from which indicated hose dispenses
               fuel. If hose dispenses from only one tank,
               this field is blank.
               Field Width: 1 decimal digit
               Valid Values: 0-7 perc: percentage of total fuel dispensed by hose that is
drawn from the first tank. If hose dispenses
from only one tank, this field is blank.
Field Width: 1 decimal digit
Valid Values: 0-7

Setup Status Response

Format:

```
;
;   Date and Time: mm/dd/yy hh:mi:ss
;
;   Control Port Setup:
;      dux Duplex,
;      bbbb Baud, nd Data Bits, ns Stop Bits, ptype Parity pen
;
;   TLM Port Setup:
;      f Selected, Port Type rs
;      bbbb Baud, nd Data Bits, ns Stop Bits, ptype Parity pen
;
;   Alarm LED Mode: almmode
;
;   LED Mode: ledmode
;
;   Printer Status: busystat, linestat, postat, errstat
;
;   TLM Status: tlmstat
;
```

Parameters:

mm/dd/yy hh:mi:ss:
        month, day, year, hour, minute, and second
           the tank volume was collected
        Field Width: each field is 1 or 2 decimal digits
        Valid Values: time is 24-hour time bbbb: Baud rate of specified port
        Field Width: 4 characters
        Valid Values: 300, 1200, 2400 nd: Number of data bits selected for port
        Field Width: 1 decimal digit
        Valid Values: 7, 8 ns: Number of stop bits for port
        Field Width: 3 decimal digits
        Valid Values: 1, 1.5, 2 ptype: Type of parity selected for port
        Field Width: 4 characters
        Valid Values: ODD, EVEN pen: Parity enable select for port
        Field Width: 8 characters
        Valid Values: ENABLED, DISABLED dux:      Full- or Half-duplex
          Field Width:  4 characters
          Valid Values: FULL, HALF f:        TLM data format selected
          Field Width:  7 characters
          Valid Values: TLS-250 rs:       TLM Port Connector selected
          Field Width:  5 characters
          Valid Values: RS422, RS232 almmode:  Mode of red front-panel alarm LED
          Field Width:  1 decimal digit
          Valid Values: 1-3 ledmode:  Mode of sixteen green LEDs
          Field Width:  1 decimal digit
          Valid Values: 1-4 linestat: Line status of parallel port
          Field Width:  8 characters
          Valid Values: ON LINE, OFF LINE postat:   Paper-out status of parallel port
          Field Width:  9 characters
          Valid Values: PAPER OUT, PAPER OK busystat: Busy status of parallel port
          Field Width:  8 characters
          Valid Values: BUSY, NOT BUSY errstat:  Error status of parallel port
          Field Width:  8 characters
          Valid Values: ERROR, NO ERROR tlmstat:  TLM fault status
          Field Width:  7 characters
          Valid Values: TIMEOUT, OKAY Accumulated Data Response Format:

```
; mm/dd/yy hh:mi:ss  RESET OCCURRED
; 1:  sales           tank           temp  water
; 2:  sales           tank           temp  water
; 3:  sales           tank           temp  water
; 4:  sales           tank           temp  water
; 5:  sales           tank           temp  water
; 6:  sales           tank           temp  water
; 7:  sales           tank           temp  water
; 8:  sales           tank           temp  water
;
CHECKSUM = cksum
```

Parameters:

mm/dd/yy,hh:mi:ss:
        month, day, year, hour, minute, and second
          the tank volume was collected
        Field Width: each field is 1 or 2 decimal digits
        Valid Values: time is 24-hour time sales:   gross volume of product dispensed, in gallons
        Field Width: 16 decimal digits
        Valid Values: all 16-digit decimal numbers, including
          decimal point.

tank:   gross volume of product in tank, in gallons
        Field Width: 16 decimal digits
        Valid Values: all 16-digit decimal numbers, including
          decimal point.

temp:   product temperature in degrees Fahrenheit
        Field Width: 5 decimal digits
        Valid Values: -99.9 - 99.9 water:   water level in inches
        Field Width: 3 decimal digits
        Valid Values: 0.0 - 9.9 cksum:   decimal message checksum
        Field Width: 5 decimal digits
        Valid Values: 0 - 65536

RESET OCCURRED: Appears if an EM24 reset occurred during the
        recording period.

NO TANK DATA: Appears in the 'tank' field if tank was not active
        or if data for the tank could not be obtained from
        the tank monitor.

NO SALES DATA: Appears in the 'sales' field if the sales data for
        the tank could not be obtained.

Accumulated Data Response - Computer Format

Format:

```
ffslttdlmmddyyhhmiss
1 sales      tank        temp water
2 sales      tank        temp water
3 sales      tank        temp water
4 sales      tank        temp water
5 sales      tank        temp water
6 sales      tank        temp water
7 sales      tank        temp water
8 sales      tank        temp water
cksum
```

Parameters:

ff: error flags indicating reset occurred (01) and checksum error.
Field Width: 2 hexadecimal digits
Valid Values: 00, 01, 02, sl: sales valid flags, one bit per tank, 1 = valid.
Field Width: 2 hexadecimal digits
Valid Values: 00 - FF tt: tank valid flag, one bit per tank, 1 = valid.
Field Width: 2 hexadecimal digits
Valid Values: 00 - FF dl: delivery in progress flag, one bit per tank, 1 = valid.
Field Width: 2 hexadecimal digits
Valid Values: 00 - FF mmddyyhhmiss:
month, day, year, hour, minute, and second
the tank volume was collected
Field Width: each field is 2 decimal digits
Valid Values: time is 24-hour time sales: gross volume of product dispensed, in gallons
Field Width: 16 decimal digits
Valid Values: all 16-digit decimal numbers, including decimal point.

tank: gross volume of product in tank, in gallons
Field Width: 16 decimal digits
Valid Values: all 16-digit decimal numbers, including decimal point.

temp: product temperature in degrees Fahrenheit
Field Width: 5 decimal digits
Valid Values: -99.9 - 99.9 water: water level in inches
Field Width: 3 decimal digits
Valid Values: 0.0 - 9.9 cksum: hexadecimal message checksum
Field Width: 4 hexadecimal digits
Valid Values: 0000 - FFFF

Tank Manifolding Status Response

Format:

```
;
;   Tank Manifolding Status
;
;   Tank 1:  t
;   Tank 2:  t
```

```
;   Tank 3:     t
;   Tank 4:     t
;   Tank 5:     t
;   Tank 6:     t
;   Tank 7:     t
;   Tank 8:     t
;
```

Parameters:

t:          tank group to which given tank is manifolded.
            Field Width:   2 hexadecimal digits
            Valid Values:  00, 01, 02,

APPENDIX C
EM24 Command Summary

```
Ctrl-A01,baud,partype,parena,data,stop,rstype<CR>   TLM Setup
Ctrl-A02,baud,partype,parena,data,stop<CR>          Ctrl Port Setup
Ctrl-A03,MM/DD/YY,HH:MI<CR>                         Set Date/Time
Ctrl-A04,ppg<CR>                                    Set Pulses/Gal
Ctrl-A05,starthr:startmin,period<CR>                Set TLM Poll Intvl Ctrl-A06,ledmode<CR>                                Set LED Usage
Ctrl-A07,ledset<CR>                                 Wrt LEDs
Ctrl-A08,almmode<CR>                                Alm LED Ctrl
Ctrl-A09,pump,enable<CR>                            Set Pump Enable
Ctrl-A0A<CR>                                        Sel TLM Conv Mode Ctrl-A0B,01<CR>                                     De-Sel TLM Conv
Ctrl-A0C<CR>                                        Sel Par Conv Mode
Ctrl-A0D,01<CR>                                     De-Sel Par Conv
Ctrl-A0E,logcode<CR>                                Warm Start
Ctrl-A0F,logcode<CR>                                Cold Start Ctrl-A10<CR>                                        Sensor Stat Req
Ctrl-A11<CR>                                        Hose Tbl Stat Req
Ctrl-A12<CR>                                        Setup Stat Req
Ctrl-A13,amtflag,record<CR>                         Accum Data Req
Ctrl-A14<CR>                                        Logout Req Ctrl-A15,logcode<CR>                                Corrupt Warm Code
Ctrl-A16,count,clrflag<CR>                          Diagnose Cntrs
Ctrl-A17<CR>                                        Manf Stat Req
Ctrl-A18,amtflag,record<CR>                         Accum Data Req-Cmptr Ctrl-B80<CR>                                        Set Hose Table
hose,tanka,tankb,percent<CR> ...
Ctrl-B<CR>

Ctrl-B81<CR>                                        Set TLM Format
format<CR>formparm<CR>formparm<CR> ...
Ctrl-B<CR>
```

```
Ctrl-B82<CR>                                              Clr Manf
tank,tank,...tank<CR>tank,tank,...tank<CR>    ...
Ctrl-B<CR>

Ctrl-B83<CR>                                              Set Manf
tank,tank,...tank<CR>tank,tank,...tank<CR>    ...
Ctrl-B<CR>
```

We claim:

1. For use in combination with apparatus to monitor liquid inventory in a storage tank, and employing multiple dispenser means to dispense liquid fuel received from the tank, there being pulse generating means operatively connected with the dispenser means to generate pulses in accordance with increments of fuel dispensed, the combination comprising
   a) interface means operatively connected to said pulse generating means to sense said pulses and to convert said pulses into first volume indicating data valves corresponding to said respective multiple dispenser means,
   b) said interface means also operatively connected to second means at said storage tank to:
      i) sense liquid level in said storage tank and to provide second volume indicating data valves, during predetermined time interval,
      ii) sense volume of liquid fuel delivered to the storage tank during said predetermined time interval, for determining liquid fuel loss or theft,
   c) and computer means operatively connected to said interface means to control the interface means, said interface means having processing means for receiving and processing said first and second data valves to provide an output or outputs indicative of fuel loss from said storage tank, and also indicative of liquid fuel delivered to said storage tank for determining liquid fuel loss or theft,
   d) said interface means including circuitry for selective operation in at least two each of the following modes:
      i) data compute mode,
      ii) command mode, to receive commands from the computer means for controlling data transmission and reception,
      iii) tank level monitor mode to receive said pulses as per a) above and to sense said liquid level in said storage tank and liquid fuel volume, as per b) above,
      iv) parallel port pass-through mode for transmitting data to a data recorder,
   e) said circuitry including ports corresponding to each of said modes of operation,
   f) and including said storage tank and said second means which are located at the storage tank.

2. The combination of claim 1 including said multiple dispenser means further comprised of multiple fuel dispensers including fuel pumps and hoses as used at a fuel station.

3. The combination of claim 2 wherein there are between 1 and 24 of said fuel dispensers.

4. The combination of claim 1 including temperature sensor means for sensing fuel temperature in the tank at a time or times during said predetermined time interval to produce output data corresponding thereto, said processing means of said interface processor operatively connected with said temperature sensor means to receive said output data for processing.

5. The combination of claim 4 including a recorder connected with said interface means to record said output or outputs of said processing means.

6. The combination of claim 1 including a recorder connected with said interface means to record said outputs or outputs of said processing means.

7. The combination of claim 1 wherein said interface means has a battery-backed, non-volatile memory to store said first and second volume indicating data values.

* * * * *